US012773774B2

(12) United States Patent
Mihara et al.

(10) Patent No.: US 12,773,774 B2
(45) Date of Patent: Oct. 27, 2026

(54) ROBOT HAVING LINK INCLUDING PROTRUDING SECTION AND RIB

(71) Applicant: KABUSHIKI KAISHA YASKAWA DENKI, Kitakyushu (JP)

(72) Inventors: Nobuhiko Mihara, Fukuoka (JP); Yuto Tanaka, Fukuoka (JP); Mayu Tatsuguchi, Fukuoka (JP); Hidenori Matsuura, Fukuoka (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 0 days.

(21) Appl. No.: 18/951,517

(22) Filed: Nov. 18, 2024

(65) Prior Publication Data

US 2025/0170704 A1 May 29, 2025

(30) Foreign Application Priority Data

Nov. 24, 2023 (JP) ................................ 2023-199190

(51) Int. Cl.
*B25J 9/00* (2006.01)
*B25J 9/04* (2006.01)
*B25J 9/10* (2006.01)

(52) U.S. Cl.
CPC ............. *B25J 9/0009* (2013.01); *B25J 9/042* (2013.01); *B25J 9/106* (2013.01)

(58) Field of Classification Search
CPC . B25J 9/0009; B25J 9/042; B25J 9/045; B25J 9/106
See application file for complete search history.

(56) References Cited

U.S. PATENT DOCUMENTS 5,375,480 A * 12/1994 Nihei .................. B25J 19/0029 901/50
11,745,364 B2 * 9/2023 Oikawa .................... B25J 9/047 74/490.01
2012/0198955 A1 8/2012 Hayashi et al.
2022/0339802 A1 10/2022 Manome
2023/0219214 A1 * 7/2023 Wang ..................... B25J 9/0015

FOREIGN PATENT DOCUMENTS

| | | | | | |
|---|---|---|---|---|---|
| CN | 205438614 | U | * | 8/2016 | |
| CN | 107511846 | | | 12/2017 | |
| CN | 107825408 | A | * | 3/2018 | .............. B25J 9/042 |
| DE | 112019007743 | T5 | * | 8/2022 | ............... F16J 15/40 |
| JP | 2012-161868 | | | 8/2012 | |
| JP | 7339476 | B1 | * | 9/2023 | ............ B25J 9/0009 |
| WO | WO-2018105584 | A1 | * | 6/2018 | ............ B25J 19/007 |

OTHER PUBLICATIONS

Extended European Search Report for corresponding EP Application No. 24210546.8-1002, Mar. 27, 2025.

* cited by examiner

*Primary Examiner* — Bobby Rushing, Jr.
(74) *Attorney, Agent, or Firm* — MORI & WARD, LLP

(57) ABSTRACT

A robot includes a link, and an actuator configured to rotate the link around a rotation axis. The link includes a connecting section connected to the actuator, a link base section crossing the rotation axis to extend from the connecting section, and a protruding section protruding from the link base section at a position away from each of the connecting section and an end portion of the link base section between the connecting section and the end portion of the link base section.

17 Claims, 11 Drawing Sheets

ROBOT HAVING LINK INCLUDING PROTRUDING SECTION AND RIB

TECHNICAL FIELD

The present disclosure relates to a robot.

CROSS-REFERENCE TO RELATED APPLICATIONS

This application is based upon and claims the benefit of priority from Japanese Patent Application No. 2023-199190, filed on Nov. 24, 2023, the entire contents of which are incorporated herein by reference.

BACKGROUND

Japanese Unexamined Patent Publication No. 2012-161868 discloses a robot including a base, a first structure, a second structure, and a third structure. The first structure is coupled to the base to be rotatable around a first axis. The second structure is coupled to the first structure to be rotatable around a second axis orthogonal to the first axis. The third structure is coupled to the second structure to be rotatable around a third axis parallel to the second axis. The second structure includes a main structural portion, an auxiliary structural portion, and a coupling portion that couples the main structural portion to the auxiliary structural portion. Each of the first structure and the third structure is sandwiched between the main structural portion and the auxiliary structural portion.

SUMMARY

A robot according to an aspect of the present disclosure includes a link, and an actuator configured to rotate the link around a rotation axis. The link includes a connecting section connected to the actuator, a link base section crossing the rotation axis to extend from the connecting section, and a protruding section protruding from the link base section at a position away from each of the connecting section and an end portion of the link base section between the connecting section and the end portion of the link base section.

DETAILED DESCRIPTION

Hereinafter, embodiments will be described with reference to the drawings. In the description, identical elements or elements having identical functions are denoted by identical reference signs, and redundant description will be omitted.

Figure 1:
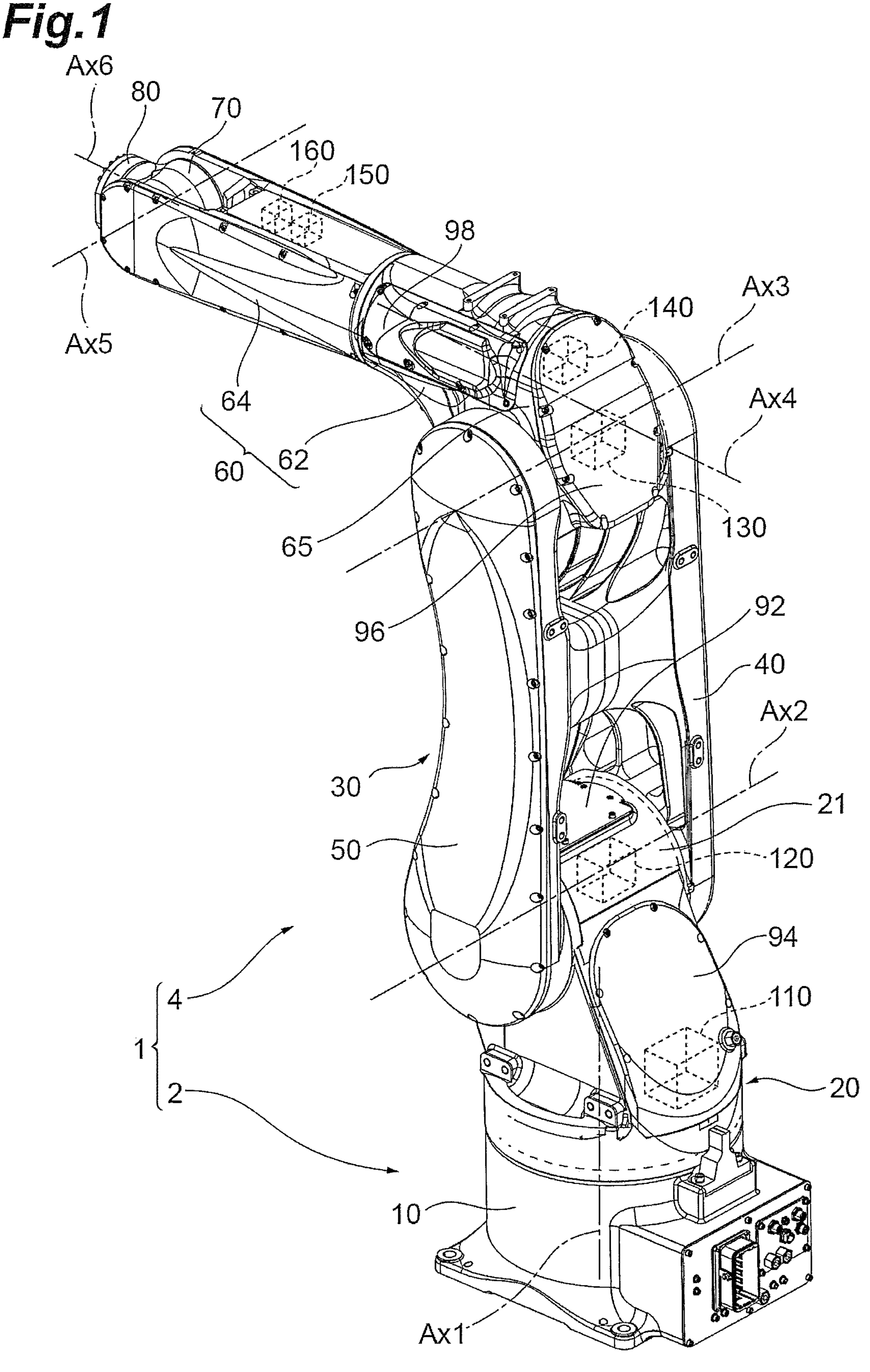
FIG. 1 is a perspective view illustrating an example of a robot.
Figure 2:
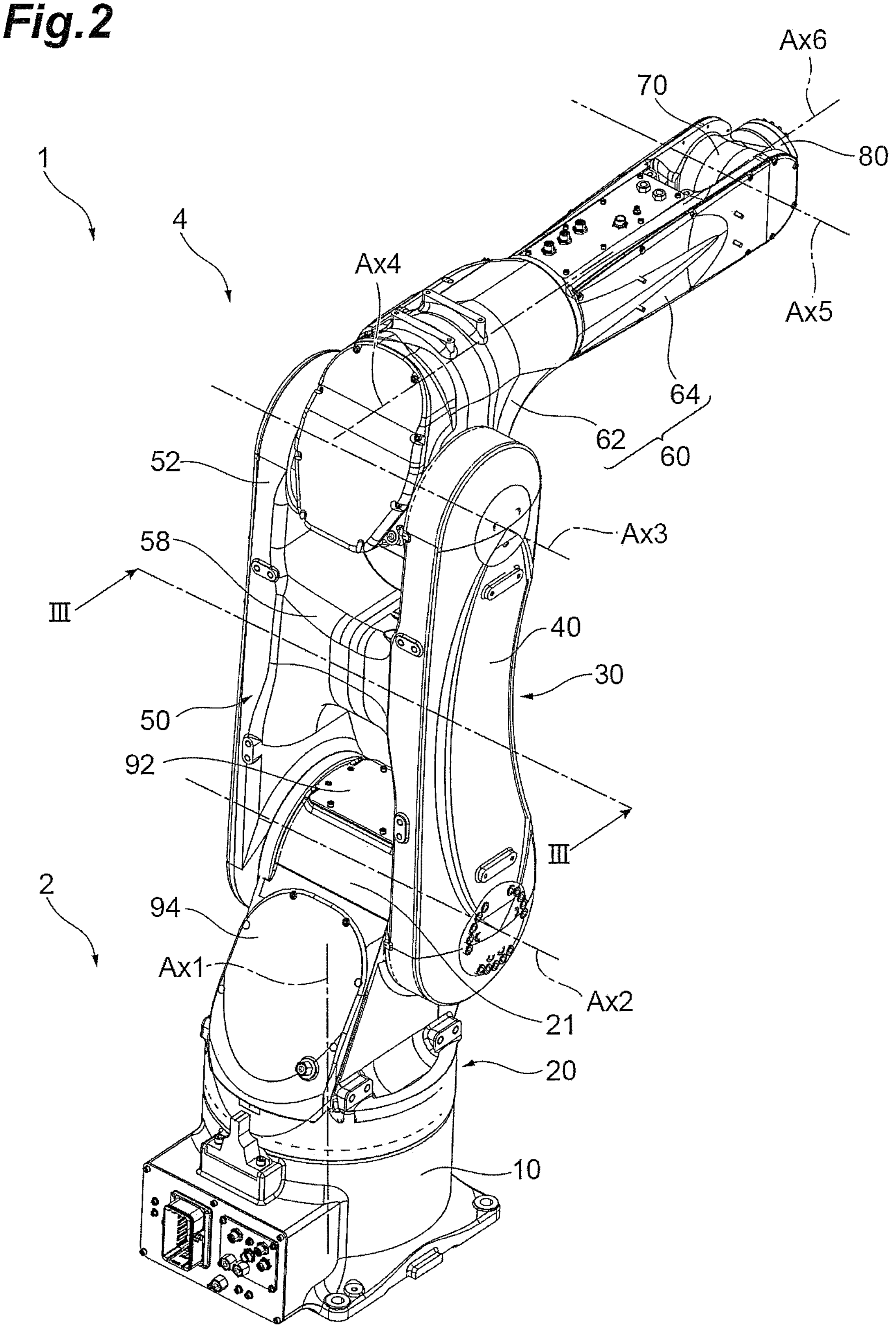
FIG. 2 is a perspective view illustrating an example of a robot.

FIGS. 1 and 2 illustrate a robot according to an embodiment. A robot 1 illustrated in FIG. 1 is a vertical articulated robot. The robot 1 automatically performs various works on a work object. The robot 1 is, for example, an industrial robot, and in one example, automatically executes various conveyance, machining, assembly, or the like on components or assemblies in production lines of products. The application of the robot 1 is not limited to industrial use. Hereinafter, an outline of a structure of the robot 1 will be first described, and then details of some members included in the robot 1 will be described.

[Outline of Robot Structure]

The robot 1 includes a base portion 2 and an articulated arm 4. The base portion 2 is a portion that supports the articulated arm 4. The articulated arm 4 is attached to the base portion 2 in a state of being rotatable and includes serial link structures.

The base portion 2 includes a base link 10 and a turning link 20. The base link 10 is also referred to as a base, and is fixed to an installation surface. The installation surface may be one surface forming a work area where a work by the robot 1 is performed. The installation surface is, for example, a bottom surface of the work area. The base link 10 may be fixed to a horizontal installation surface. The base link 10 may be fixed to an installation surface on a moving body such as an automatic guided vehicle (AGV).

The turning link 20 is connected to the base link 10 to rotate (turn) around a rotation axis Ax1 (turning axis). The turning link 20 is attached to the base link 10 to be positioned above the base link 10, for example. The rotation axis Ax1 may be set to pass through the base link 10 and the turning link 20. The turning link 20 may be provided on the base link 10 to rotate around the vertical rotation axis Ax1.

In the present disclosure, "upper" and "lower" are used to indicate an arrangement relationship when the structure of the robot 1 is described. "Upper" and "lower" mean "upper" and "lower" in a state where the rotation axis Ax1 is positioned vertically and the turning link 20 is positioned on the base link 10, but the base portion 2 may not necessarily be arranged in this manner. The base portion 2 may be arranged, for example, such that the turning link 20 is positioned below the base link 10 or such that the turning link 20 is positioned on a side of the base link 10. The base link 10 may be fixed to a wall surface of the work area or may be fixed to a ceiling surface of the work area.

The articulated arm 4 includes, for example, an arm link 30, an arm link 60, an arm link 70, and a tool attachment portion 80. Each of the arm link 30, the arm link 60, and the arm link 70 is also simply referred to as an arm.

The arm link 30 is connected to the turning link 20 to rotate around a rotation axis Ax2. The rotation axis Ax2 crosses, for example, the rotation axis Ax1. In the present disclosure, "crossing" also includes a skew relationship like a so-called grade separation. The arm link 30 may extend away from the rotation axis Ax2. The arm link 30 (second link) may be aligned with the turning link 20 (first link) along the rotation axis Ax2. The rotation axis Ax2 may be orthogonal to the rotation axis Ax1. The rotation axis Ax2 may be set to pass through a proximal end portion of the arm link 30 and the turning link 20.

The arm link 60 is connected to the arm link 30 to rotate around a rotation axis Ax3 (second rotation axis) parallel to the rotation axis Ax2. The arm link 60 is connected to, for example, a distal end portion (end portion) of the arm link 30. The arm link 60 may extend away from the rotation axis Ax3. The arm link 60 (third link) may be aligned with the arm link 30 along the rotation axis Ax3. The rotation axis Ax3 may be set to pass through the distal end portion of the arm link 30 and a proximal end portion of the arm link 60.

The arm link 60 includes an arm base portion 62 and a turning arm 64. The arm base portion 62 (third link) is a link connected to the distal end portion of the arm link 30 so as to rotate around the rotation axis Ax3. The arm base portion 62 may extend away from the rotation axis Ax3. The arm base portion 62 may be aligned with the arm link 30 along the rotation axis Ax3. The turning arm 64 (fourth link) is a link connected to the arm base portion 62 to rotate around a rotation axis Ax4 crossing the rotation axis Ax3. The turning arm 64 may extend from the arm base portion 62 along a direction in which the arm base portion 62 extends. The rotation axis Ax4 may be orthogonal to the rotation axis Ax3. The rotation axis Ax4 may be set to pass through the arm base portion 62 and the turning arm 64.

The arm link 70 is connected to the arm link 60 to rotate around a rotation axis Ax5 crossing the rotation axis Ax4. The arm link 70 is attached to, for example, a distal end portion of the turning arm 64 of the arm link 60. The rotation axis Ax5 may be orthogonal to the rotation axis Ax4. The rotation axis Ax5 may be set to pass through the distal end portion of the turning arm 64 and the arm link 70.

The tool attachment portion 80 is connected to the arm link 70 to rotate around a rotation axis Ax6 crossing the rotation axis Ax5. The rotation axis Ax6 may be orthogonal to the rotation axis Ax5. The rotation axis Ax6 may be set to pass through the arm link 70 and the tool attachment portion 80. A working tool is attached to the tool attachment portion 80. An example of the working tool is a suction nozzle configured to suck a workpiece, a hand configured to grip a workpiece, a welding torch, a screw tightening tool, or a polishing tool.

The robot 1 includes an actuator 110, an actuator 120, an actuator 130, an actuator 140, an actuator 150, and an actuator 160. In FIG. 1, each actuator is schematically illustrated by a broken line in a simplified manner, and a diagram of each actuator is omitted in FIG. 2. Each actuator may include a motor and a speed reducer.

The actuator 110 rotates the turning link 20 around the rotation axis Ax1 with respect to the base link 10. The actuator 120 rotates the arm link 30 around the rotation axis Ax2 with respect to the turning link 20. The actuator 130 (second actuator) rotates the arm base portion 62 of the arm link 60 around the rotation axis Ax3 with respect to the arm link 30.

The actuator 140 rotates the turning arm 64 of the arm link 60 around the rotation axis Ax4 with respect to the arm base portion 62. The actuator 150 rotates the arm link 70 around the rotation axis Ax5 with respect to the turning arm 64 of the arm link 60. The actuator 160 rotates the tool attachment portion 80 around the rotation axis Ax6 with respect to the arm link 70.

[Arm Link]

Next, a structure of the arm link 30 and some members positioned inside or around the arm link 30 will be described in detail. The arm link 30 may include two sub-links. As illustrated in FIG. 1 or 2, the arm link 30 may include a drive link 40 (link) and an auxiliary link 50 as two sub-links.

The drive link 40 (first sub-link) and the auxiliary link 50 (second sub-link) may sandwich the actuator 120 along the rotation axis Ax2. In a case where the members are observed on the rotation axis Ax2, the drive link 40, the actuator 120, and the auxiliary link 50 may be arranged in this order. The drive link 40 and the auxiliary link 50 may sandwich the actuator 130 along the rotation axis Ax3. When the members are observed on the rotation axis Ax3, the drive link 40, the actuator 130, and the auxiliary link 50 may be arranged in this order.

The auxiliary link 50 may be made of a material (second material) having rigidity and specific gravity smaller than a material (first material) forming the drive link 40. The rigidity of the material forming the auxiliary link 50 may be smaller than the rigidity of the material forming the drive link 40, and the specific gravity of the material forming the auxiliary link 50 may be smaller than the specific gravity of the material forming the drive link 40. For example, in a case where the material forming the drive link 40 is a material containing iron, the material forming the auxiliary link 50 is a material containing aluminum. A thermal expansion coefficient (linear expansion coefficient) may be different between the material forming the drive link 40 and the material forming the auxiliary link 50.

<Drive Link>

Figure 3:
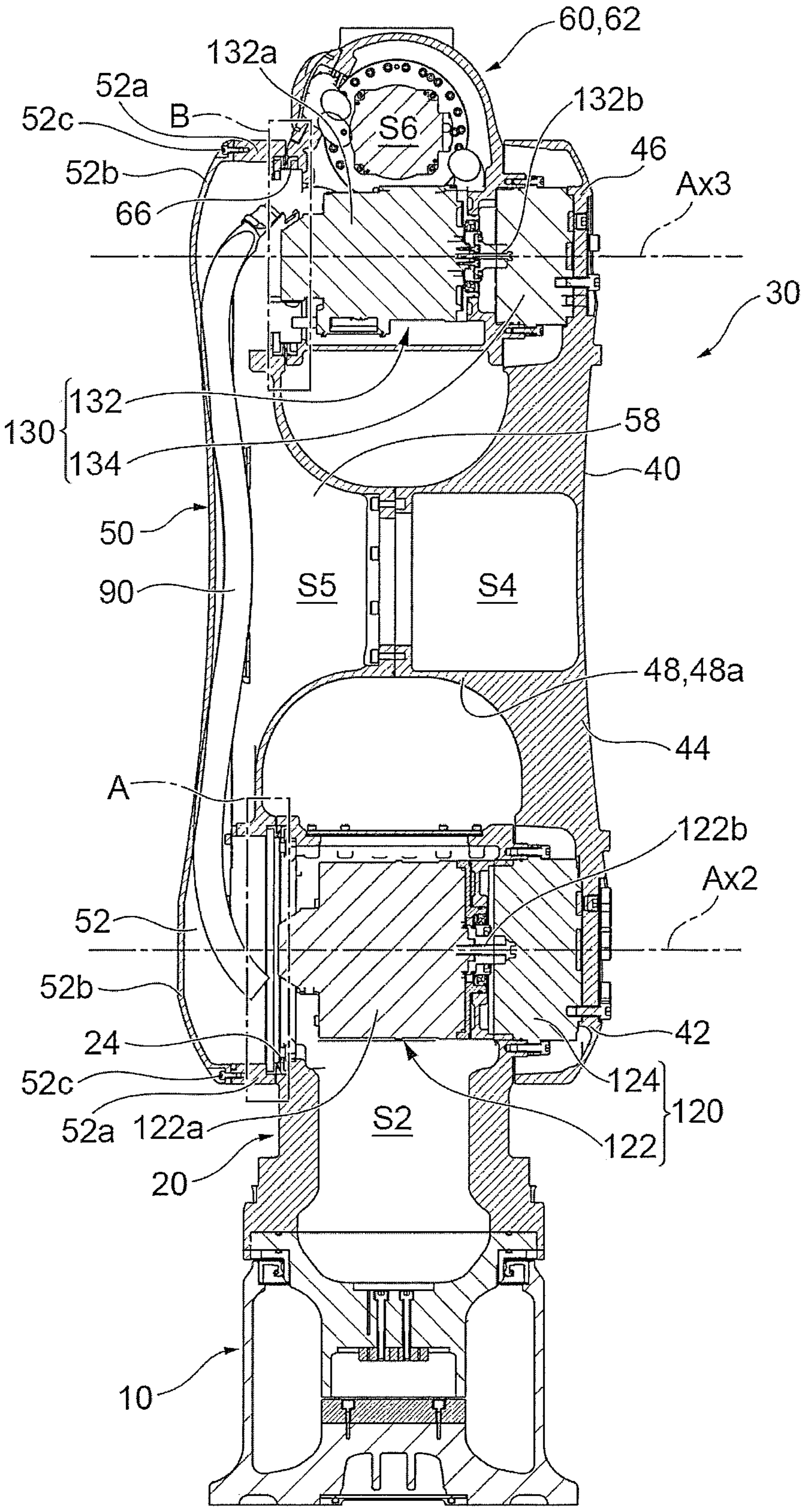
FIG. 3 is a sectional view illustrating an example of an inside of a robot.

The drive link 40 is a link driven by the actuator 120. For example, a driving force by the actuator 120 is directly transmitted to the drive link 40. The drive link 40 may be connected to the turning link 20. The actuator 120 rotates the drive link 40 around the rotation axis Ax2 with respect to the turning link 20. FIG. 3 illustrates a section taken along line III-III drawn in FIG. 2. The actuator 120 is connected to any portion of the drive link 40. The drive link 40 (second link) may be aligned with the turning link 20 (first link) along the rotation axis Ax2. The drive link 40 may extend away from the rotation axis Ax2.

The actuator 120 may be accommodated in the turning link 20. The turning link 20 may include an internal space S2 and an opening 24 (see also FIG. 8). The internal space S2 is a space for accommodating the actuator 120. At least a part of the actuator 120 may be accommodated in the internal space S2. The turning link 20 includes a housing 21. The housing 21 is constituted by a wall forming the internal space S2. The opening 24 is an opening formed in the housing 21.

In FIG. 3, the motor included in the actuator 120 is indicated by "122", and the speed reducer included in the actuator 120 is indicated by "124". The motor 122 includes a motor body 122*a* and an output shaft 122*b*. The motor 122 rotates the drive link 40 around the rotation axis Ax2 with respect to the turning link 20. The motor 122 may be accommodated in the internal space S2 in the turning link 20. The motor 122 may be arranged such that the motor body 122*a* is accommodated in the internal space S2 in the turning link 20. The motor 122 may be installed such that the output shaft 122*b* is horizontal. The output shaft 122*b* of the motor 122 is connected to the speed reducer 124. In one example, an output shaft of the speed reducer 124 of the actuator 120 is connected to the drive link 40.

The actuator 130 for driving the arm base portion 62 of the arm link 60 rotates the arm base portion 62 around the rotation axis Ax3 with respect to the drive link 40 of the arm link 30. The actuator 130 is connected to any portion of the drive link 40. For example, a driving force by the actuator 130 is applied to the drive link 40, and thus, the arm base portion 62 rotates with respect to the drive link 40. The arm base portion 62 (second link) of the arm link 60 may be connected to an end portion of the drive link 40. The arm base portion 62 (second link) of the arm link 60 may be aligned with the drive link 40.

The actuator 130 may be accommodated in the arm base portion 62 of the arm link 60. The arm base portion 62 of the arm link 60 may include an internal space S6 and an opening 66 (see also FIG. 10). The internal space S6 is a space for accommodating the actuator 130. At least a part of the actuator 130 may be accommodated in the internal space S6. The arm base portion 62 of the arm link 60 has a housing 65. The housing 65 is constituted by a wall forming the internal space S6. The opening 66 is an opening formed in the housing 65.

In FIG. 3, the motor included in the actuator 130 is indicated by "132", and the speed reducer included in the actuator 130 is indicated by "134". The motor 132 includes a motor body 132*a* and an output shaft 132*b*. The motor 132 (second motor) rotates the arm base portion 62 around the rotation axis Ax3 with respect to the drive link 40. The motor 132 may be accommodated in the arm base portion 62. The motor 132 may be arranged such that the motor body 132*a* is accommodated in the internal space S6 in the arm base portion 62. The motor 132 may be installed such that the output shaft 132*b* is horizontal. The output shaft 132*b* of the motor 132 is connected to the speed reducer 134. In one example, an output shaft of the speed reducer 134 of the actuator 130 is connected to the drive link 40.

Figure 4:
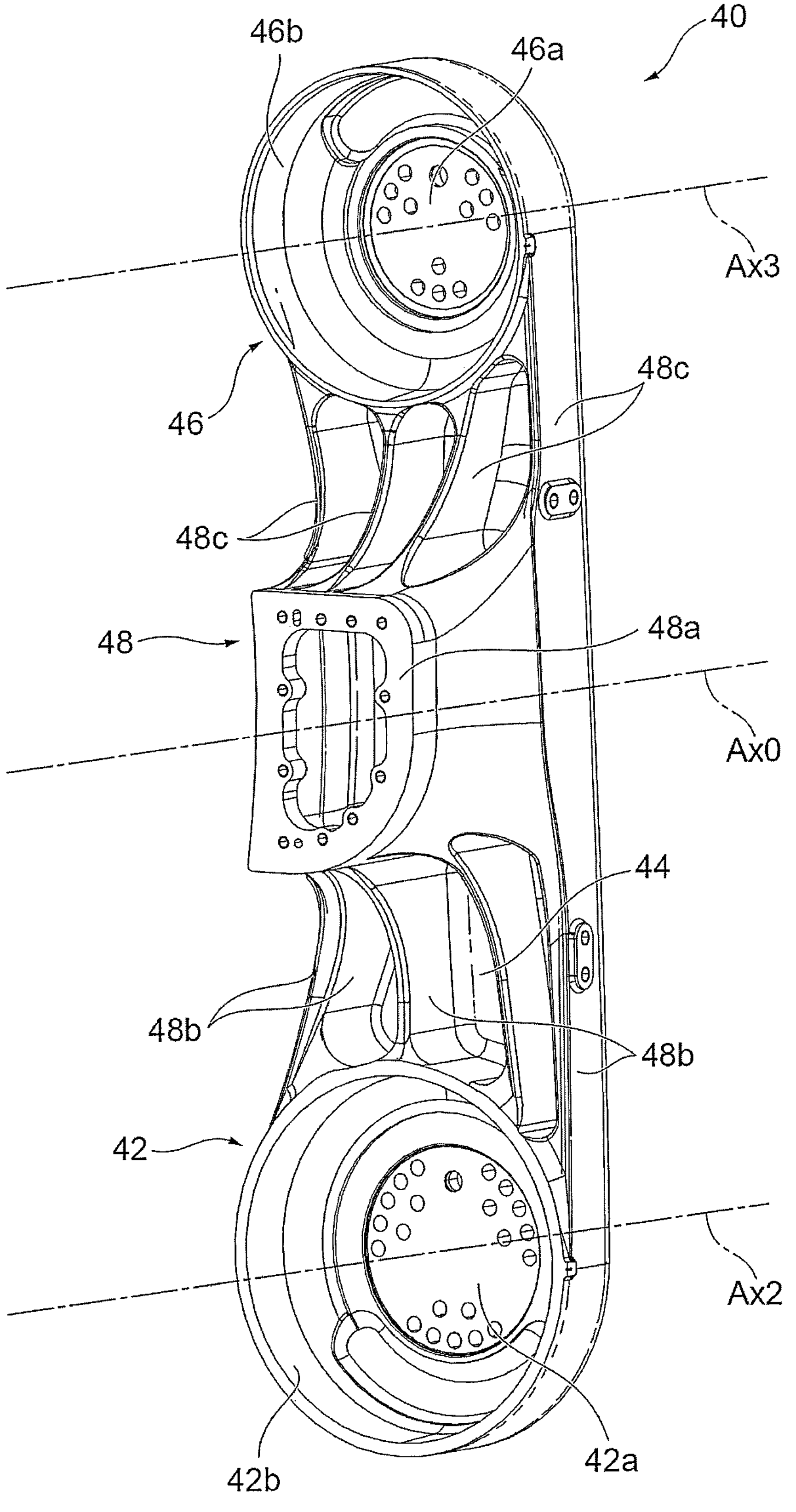
FIG. 4 is a perspective view illustrating an example of a drive link.
Figure 5:
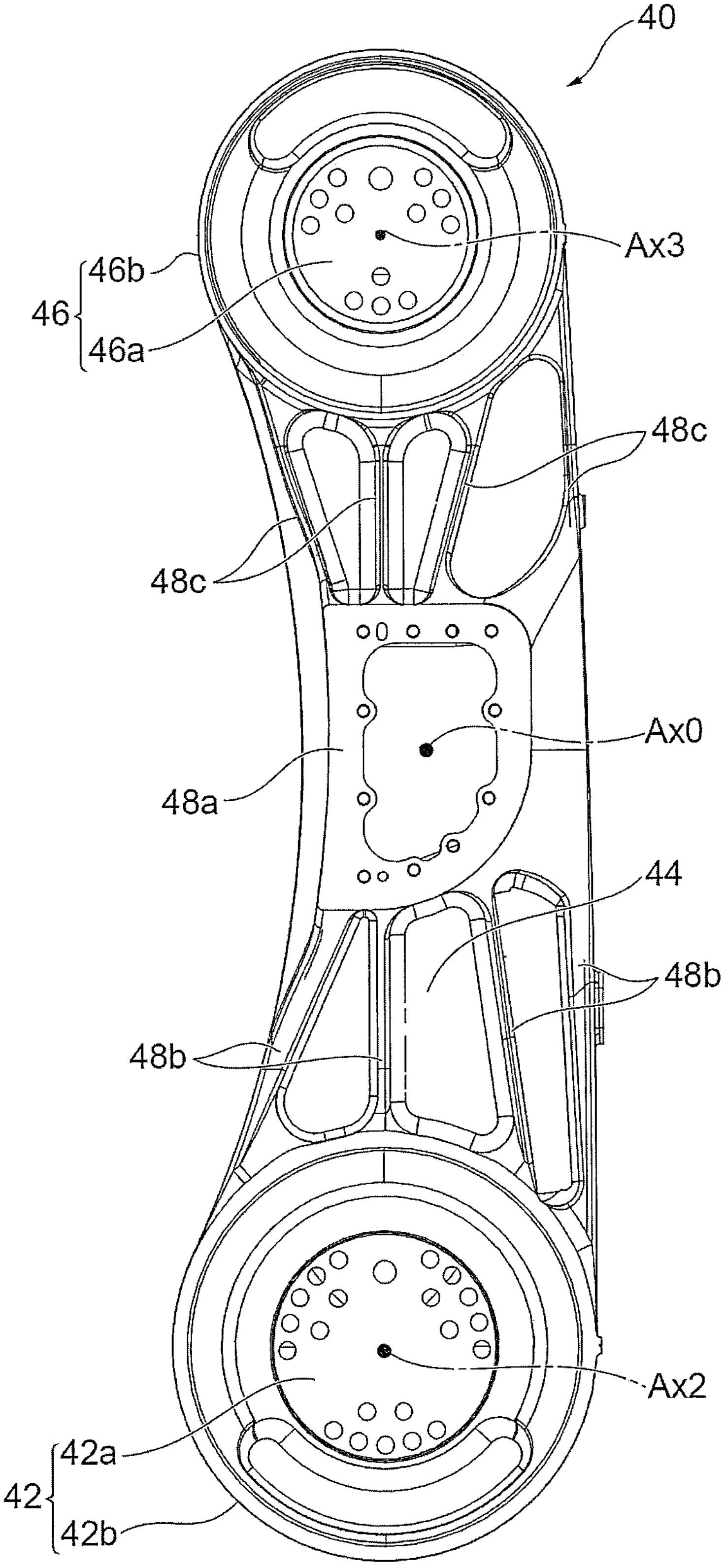
FIG. 5 is a side view illustrating an example of a drive link.
Figure 6:
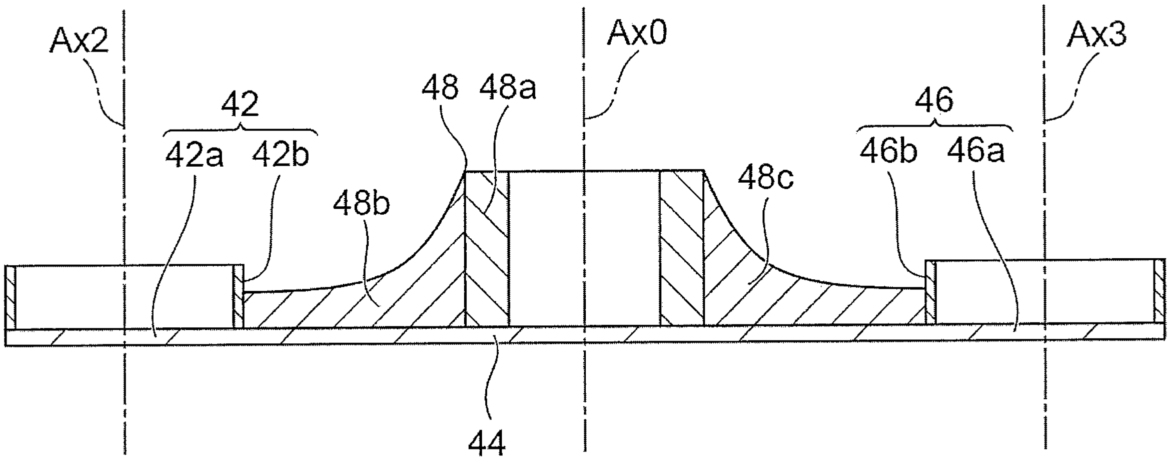
FIG. 6 is a side view schematically illustrating an example of a drive link.

FIG. 4 illustrates a perspective view of the drive link 40, and FIG. 5 illustrates a side view of the drive link 40 as viewed from a direction along the rotation axis Ax2. FIG. 6 is a schematic view in a case where a side surface of the drive link 40 is viewed from a direction orthogonal to a plane including the rotation axis Ax2 and the rotation axis Ax3. As illustrated in FIG. 4 and the like, the drive link 40 is formed to extend over both the rotation axis Ax2 and the rotation axis Ax3. A direction in which the entire drive link 40 extends may be along a line segment connecting the rotation axis Ax2 and the rotation axis Ax3 at a shortest distance.

The drive link 40 may be attached to the actuator 120. The drive link 40 may be attached to the actuator 130. The drive link 40 includes, for example, a connecting section 42, a connecting section 46, a link base section 44, and a reinforcing section 48. In a case where the drive link 40 is observed from the rotation axis Ax2 toward the rotation axis Ax3, the connecting section 42, the link base section 44, and the connecting section 46 are aligned in this order.

The connecting section 42 is a portion connected to the actuator 120. For example, the output shaft of the speed reducer 124 of the actuator 120 is connected to the connecting section 42. The connecting section 42 may include a connecting base section 42*a* and a surrounding wall 42*b*. A space for accommodating at least a part of the actuator 120 (for example, the speed reducer 124 of the actuator 120) is formed by the connecting base section 42*a* and the surrounding wall 42*b*.

The connecting base section 42*a* is a portion connected to the actuator 120. For example, the output shaft of the speed reducer 124 of the actuator 120 is connected to the connecting base section 42*a*. The connecting base section 42*a* may be formed to spread along a plane crossing the rotation axis Ax2. A thickness of the connecting base section 42*a* may not be constant, and at least a part of each of a pair of main surfaces of the connecting base section 42*a* may not be a plane. A shape of the connecting base section 42*a* may be circular as viewed from the rotation axis Ax2.

The surrounding wall 42*b* is a portion protruding from the connecting base section 42*a* to surround at least a part of the actuator 120. The surrounding wall 42*b* is formed in an annular shape to surround at least a part of the speed reducer 124, for example. The surrounding wall 42*b* protrudes in a predetermined direction from an outer edge portion (outer edge and a portion in the vicinity thereof) of the connecting base section 42*a*. The surrounding wall 42*b* protrudes, for example, in an axial direction in which the rotation axis Ax2 extends.

The connecting section 46 (second connecting section) is a portion connected to the actuator 130 (second actuator). For example, the output shaft of the speed reducer 134 of the actuator 130 is connected to the connecting section 46. The connecting section 46 may include a connecting base section 46*a* (second connecting base section) and a surrounding wall 46*b* (second surrounding wall). A space for accommodating at least a part of the actuator 130 (for example, the speed reducer 134 of the actuator 130) is formed by the connecting base section 46*a* and the surrounding wall 46*b*.

The connecting base section 46*a* is a portion connected to the actuator 130. For example, the output shaft of the speed reducer 134 of the actuator 130 is connected to the connecting base section 46*a*. The connecting base section 46*a* may be formed to spread along the plane crossing the rotation axis Ax2. A thickness of at least a part of the connecting base section 46*a* may not be constant, and at least a part of each of a pair of main surfaces of the connecting base section 46*a* may not be a plane. A shape of the connecting base section 46*a* may be circular as viewed from the rotation axis Ax3.

The surrounding wall 46*b* is a portion protruding from the connecting base section 46*a* to surround at least a part of the actuator 130. The surrounding wall 46*b* is formed in an annular shape to surround at least a part of the speed reducer 134, for example. The surrounding wall 46*b* protrudes in a predetermined direction from an outer edge portion (outer edge and a portion in the vicinity thereof) of the connecting base section 46*a*. The surrounding wall 46*b* protrudes, for example, in an axial direction in which the rotation axis Ax3 extends.

The link base section 44 is a portion extending from the connecting section 42 while crossing the rotation axis Ax2. The link base section 44 is connected to the connecting section 46 and also crosses the rotation axis Ax3. The link base section 44 may be formed to spread along the plane crossing the rotation axis Ax2. A thickness of at least a part of the link base section 44 may not be constant, and at least a part of each of a pair of main surfaces of the link base section 44 may not be a plane.

As viewed from the axial directions of the rotation axis Ax2 and the rotation axis Ax3, the link base section 44 is formed to extend along a virtual line segment connecting the rotation axis Ax2 and the rotation axis Ax3. The connecting base section 42*a* of the connecting section 42 is continued to the link base section 44, and the connecting base section 46*a* of the connecting section 46 is continued to the link base section 44. The connecting section 42 (the connecting base section 42*a* and the surrounding wall 42*b*), the link base section 44, and the connecting section 46 (the connecting base section 46*a* and the surrounding wall 46*b*) may be integrally formed.

Here, as viewed from a direction parallel to the rotation axis Ax2 and the rotation axis Ax3, a direction orthogonal to a virtual straight line passing through the rotation axis Ax2 and the rotation axis Ax3 is defined as a "width direction" in the drive link 40. The link base section 44 is formed such that a size in the width direction decreases at a central portion between the rotation axis Ax2 and the rotation axis Ax3. The size of the link base section 44 in the width direction increases as it approaches the connecting section 42, starting from the central portion between the rotation axis Ax2 and the rotation axis Ax3. The size of the link base section 44 in the width direction increases as it approaches the connecting section 46, starting from the central portion between the rotation axis Ax2 and the rotation axis Ax3.

The reinforcing section 48 is formed to increase rigidity while reducing a weight of the drive link 40. The reinforcing section 48 may be formed to protrude from the link base section 44 between the connecting section 42 and an end portion (an end portion close to the rotation axis Ax3) of the link base section 44. For example, the reinforcing section 48 is formed integrally with the link base section 44 to protrude from the link base section 44 between the connecting section 42 and the connecting section 46. The reinforcing section 48 may protrude in the same direction as the surrounding wall 42*b* and the surrounding wall 46*b*, and may be connected to the surrounding wall 42*b* and the surrounding wall 46*b*.

The reinforcing section 48 includes a protruding section 48*a*. The protruding section 48*a* is a portion protruding from the link base section 44 at a position away from each of the connecting section 42 and the end portion of the link base section 44 (the end portion close to the rotation axis Ax3). The protruding section 48*a* may be formed in an annular shape around an axis Ax0 crossing the link base section 44. The axis Ax0 is a virtual axis that crosses a direction in which the link base section 44 extends and passes through the link base section 44. As viewed from the direction parallel to the rotation axis Ax2 and the rotation axis Ax3, the protruding section 48*a* surrounds the axis Ax0. The axis Ax0 may pass through a center of gravity of a region defined by an opening edge at an inner edge of the annular protruding section 48*a*. A length of a line segment connecting the rotation axis Ax2 and the axis Ax0 at a shortest distance may be about 0.8 to 1.2 times a length of a line segment connecting the rotation axis Ax3 and the axis Ax0 at a shortest distance.

At least a part of the protruding section 48*a* may be formed such that the size in the width direction decreases as it extends away from the link base section 44. Instead of or in addition to the width direction, at least a part of the protruding section 48*a* may be formed such that the size in the direction in which the link base section 44 extends decreases as a distance from the link base section 44 increases. As viewed from the direction parallel to the rotation axis Ax2 and the rotation axis Ax3, an end surface of the protruding section 48*a* in the direction parallel to the rotation axis Ax2 and the rotation axis Ax3 (an end surface along the direction crossing the axis Ax0) may be positioned inside an outer edge of the link base section 44. In the width direction, a maximum width of the end surface of the protruding section 48*a* is smaller than a minimum width of the link base section 44. A protruding height of the protruding section 48*a* from the link base section 44 may be higher than a protruding height of the surrounding wall 42*b* from the connecting base section 42*a*, or may be higher than the protruding height of the surrounding wall 46*b* from the connecting base section 46*a*.

The reinforcing section 48 may include one or more ribs 48*b*. The rib 48*b* may be formed to protrude from the link base section 44, and may be connected to at least the protruding section 48*a*. As illustrated in FIG. 4 and the like, the rib 48*b* may be formed to connect the protruding section 48*a* and the connecting section 42. One end of the rib 48*b* may be connected to the protruding section 48*a*, and the other end of the rib 48*b* may be connected to the connecting section 42. Unlike the example illustrated in FIG. 4 and the like, the rib 48*b* may be connected to the protruding section 48*a* without being connected to the connecting section 42. In one example, the protruding section 48*a* and the rib 48*b* protrude in the same direction as the surrounding wall 42*b* of the connecting section 42, and the rib 48*b* (the other end of the rib 48*b*) is connected to the surrounding wall 42*b*. At least in the direction in which the link base section 44 extends, a protruding height of the rib 48*b* with respect to the link base section 44 may be increased as a distance from the protruding section 48*a* decreases. Even in a direction crossing the direction in which the link base section 44 extends, the protruding height of the rib 48*b* with respect to the link base section 44 may increase as a distance from the protruding section 48*a* decreases.

The reinforcing section 48 may include one or more ribs 48*c* (second ribs). The rib 48*c* may be formed to protrude from the link base section 44, and may be connected to at least the protruding section 48*a*. As illustrated in FIG. 4 and the like, the rib 48*c* may be formed to connect the protruding section 48*a* and the connecting section 46. One end of the rib 48*c* may be connected to the protruding section 48*a*, and the other end of the rib 48*b* may be connected to the connecting section 46. Unlike the example illustrated in FIG. 4 and the like, the rib 48*c* may be connected to the protruding section 48*a* without being connected to the connecting section 46. In one example, the protruding section 48*a* and the rib 48*c* protrude in the same direction as the surrounding wall 46*b* of the connecting section 46, and the rib 48*c* (the other end of the rib 48*b*) is connected to the surrounding wall 46*b*. At least in the direction in which the link base section 44 extends, a protruding height of the rib 48*c* with respect to the link base section 44 may be increased as a distance from the protruding section 48*a* decreases. Even in the direction crossing the direction in which the link base section 44 extends, the protruding height of the rib 48*c* with respect to the link base section 44 may increase as a distance from the protruding section 48*a* decreases.

The reinforcing section 48 may include one of one or more ribs 48*b* and one or more ribs 48*c*, or may include both of one or more ribs 48*b* and one or more ribs 48*c*. The reinforcing section 48 may include the protruding section 48*a* without having both of one or more ribs 48*b* and one or more ribs 48*c*. Hereinafter, a case where both one or more ribs 48*b* and one or more ribs 48*c* are provided will be exemplified.

A protruding height of the end surface of the protruding section 48*a* which faces away the link base section 44 may be substantially constant. A protruding height of a certain point of the reinforcing section 48 is defined by a shortest distance between that point and a reference position set in the link base section 44, along a line passing through that point and extending in the axial direction of the rotation axis Ax2.

The protruding section 48*a* may be a solid rib (protrusion) instead of the rib (protrusion) formed in the annular shape. When a section of the protruding section 48*a* orthogonal to the rotation axis Ax2 is observed, the section may be annular, or may be a solid (state where an inside of an object is clogged). In one example, the reinforcing section 48 includes a plurality of ribs 48*b* as one or more ribs 48*b*, and includes a plurality of ribs 48*c* as one or more ribs 48*c*.

Each of the plurality of ribs 48*b* is a rib (protrusion) that connects the protruding section 48*a* and the surrounding wall 42*b* of the connecting section 42. Each of the plurality of ribs 48*b* extends from one of the protruding section 48*a* and the surrounding wall 42*b* toward the other. In a case where attention is paid to each rib 48*b* included in the plurality of ribs 48*b*, one end of the rib 48*b* is connected to the protruding section 48*a*, and the other end of the rib 48*b* is connected to the surrounding wall 42*b*.

An interval between the plurality of ribs 48*b* may increase as the distance from the protruding section 48*a* increases. The interval between the plurality of ribs 48*b* is defined by a shortest distance between one rib 48*b* and another rib 48*b* in the width direction. In a case where three or more ribs 48*b* are provided, an interval between at least one any selected pair of ribs 48*b* may increase as the distance from the protruding section 48*a* increases. In three or more ribs 48*b*, for all combinations of the pair of ribs 48*b*, the interval between the pair of ribs 48*b* may increase as the distance from the protruding section 48*a* increases.

For at least a part of the plurality of ribs 48*b*, the protruding height of the rib 48*b* may decrease as the distance from the protruding section 48*a* increases. In other words, for at least a part of the plurality of ribs 48*b*, the protruding height of the rib 48*b* may increase as the distance from the protruding section 48*a* decreases. For all of the plurality of ribs 48*b*, the protruding height of the rib 48*b* may decrease as the distance from the protruding section 48*a* increases.

Each of the plurality of ribs 48*c* (the plurality of second ribs) is a rib (protrusion) that connects the protruding section 48*a* and the surrounding wall 46*b* of the connecting section 46. Each of the plurality of ribs 48*c* extends from one of the protruding section 48*a* and the surrounding wall 46*b* toward the other. In a case where attention is paid to each rib 48*c* included in the plurality of ribs 48*c*, one end of the rib 48*c* is connected to the protruding section 48*a*, and the other end of the rib 48*c* is connected to the surrounding wall 46*b*.

The interval between the plurality of ribs 48*c* may increase as the distance from the protruding section 48*a* increases. An interval between the plurality of ribs 48*c* is defined by a shortest distance between one rib 48*c* and another rib 48*c* in the width direction. In a case where three or more ribs 48*c* are provided, an interval between at least one any selected pair of ribs 48*c* may increase as the distance from the protruding section 48*a* increases. In three or more ribs 48*c*, for all combinations of the pair of ribs 48*c*, the interval between the pair of ribs 48*c* may increase as the distance from the protruding section 48*a* increases.

For at least a part of the plurality of ribs 48*c*, the protruding height of the rib 48*c* may decrease as the distance from the protruding section 48*a* increases. In other words, for at least a part of the plurality of ribs 48*c*, the protruding height of the rib 48*c* may increase as the distance from the protruding section 48*a* decreases. For all of the plurality of ribs 48*c*, the protruding height of the rib 48*c* may decrease as the distance from the protruding section 48*a* increases.

<Auxiliary Link>

Referring back to FIG. 3, the auxiliary link 50 is a link that rotates as the drive link 40 is driven. The auxiliary link 50 may extend over between the rotation axis Ax2 and the rotation axis Ax3, and may rotate around the rotation axis Ax2 together with the drive link 40. The actuator 120 that rotates the arm link 30 may not be connected to the auxiliary link 50, and the driving force by the actuator 120 may not be directly transmitted. The actuator 130 that rotates the arm link 60 may not be connected to the auxiliary link 50.

Similarly to the drive link 40, the auxiliary link 50 may be formed to extend along a line segment connecting the rotation axis Ax2 and the rotation axis Ax3 at a shortest distance. Each of the actuator 120 and the actuator 130 is positioned between the drive link 40 and the auxiliary link 50. The actuator 120 may be arranged between the connecting section 42 of the drive link 40 and a proximal end portion (an end portion through which the rotation axis Ax2 passes) of the auxiliary link 50. The actuator 130 may be arranged between the connecting section 46 of the drive link 40 and a distal end portion (an end portion through which the rotation axis Ax3 passes) of the auxiliary link 50.

The robot 1 may include a cable harness 90. The cable harness 90 is connected to at least the actuator 120, for example. The cable harness 90 may be connected to at least the actuator 130 via the internal space S2 of the turning link 20. The cable harness 90 may include two or more cables. The cable harness 90 may be connected to at least the actuator 120 and the actuator 130. In the cable harness 90, the cable connected to the actuator 120 may be different from the cable connected to the actuator 130. The cable harness 90 may be physically and electrically connected to each of the actuator 120 and the actuator 130. The cable harness 90 may include at least one of a cable that supplies power to the actuator 120, a cable that supplies power to the actuator 130, a cable that transmits a signal to or/and from the actuator 120, and a cable that transmits a signal to or/and from the actuator 130. The cable harness 90 may be connected to at least the motor 132 via an inside (internal space S2) of the turning link 20. The cable harness 90 may be connected to at least the motor 122 and the motor 132.

The auxiliary link 50 may include a wiring space S5 for guiding the cable harness 90. The wiring space S5 may be a space for guiding the cable harness 90 from the internal space S2 to the actuator 130. The cable harness 90 may be accommodated in the wiring space S5 formed by the auxiliary link 50. The auxiliary link 50 may accommodate the cable harness 90 such that the cable harness 90 is not exposed to an outside.

The opening 24 of the turning link 20 described above may be an opening that allows the internal space S2 of the turning link 20 to communicate with an outside of the internal space S2. The opening 24 may allow the internal space S2 of the turning link 20 to communicate with the wiring space S5. The cable harness 90 may be wired through the opening 24 and the wiring space S5. The opening 66 (second opening) of the arm link 60 described above may be an opening that allows the internal space S6 (second internal space) of the arm link 60 to communicate with an outside of the internal space S6. The opening 66 may allow the internal space S6 of the arm link 60 to communicate with the wiring space S5. The cable harness 90 may be wired from the internal space S2 to the internal space S6 via the opening 24, the wiring space S5, and the opening 66. The wiring space S5 may be a space for guiding the cable harness 90 from the inside of the turning link 20 (internal space S2) to the inside of the arm base portion 62 (internal space S6).

The auxiliary link 50 may be attached to the reinforcing section 48 of the drive link 40. For example, the auxiliary link 50 is fixed to the end surface of the protruding section 48*a* of the reinforcing section 48 facing the auxiliary link 50 by a fixing member. An internal space S4, which is a space inside the protruding section 48*a* formed in an annular shape, and the wiring space S5 in the auxiliary link 50 may communicate with each other at a connecting portion between the auxiliary link 50 and the reinforcing section 48.

The auxiliary link 50 may include a link body 52 (sub-link body) and a protruding section 58 (sub-protruding section) (see also FIG. 2). The link body 52 is a body portion of the auxiliary link 50, and is a portion extending over between the rotation axis Ax2 and the rotation axis Ax3. The protruding section 58 is a portion protruding from the link body 52 toward the reinforcing section 48, and may be formed in an annular shape. The protruding section 58 may be attached to the reinforcing section 48 of the drive link 40. The protruding section 58 may include an end surface facing the drive link 40, and the protruding section 58 and the reinforcing section 48 may be fixed to each other in a state where the end surface of the protruding section 58 comes into contact with a corresponding end surface of the protruding section 48*a* of the reinforcing section 48.

The auxiliary link 50 may be attached to the drive link 40 in a state of not being constrained from the turning link 20 in a direction crossing the rotation axis Ax2. The auxiliary link 50 may be fixed to the drive link 40 in a state where relative movement with respect to the turning link 20 is possible in the direction crossing the rotation axis Ax2. The robot 1 may include a bearing that holds the auxiliary link 50 to rotate around the rotation axis Ax2.

The auxiliary link 50 may be attached to the drive link 40 in a state of not being constrained from the turning link 20 in the direction crossing the rotation axis Ax2 and not being constrained from the arm base portion 62 (arm link 60) in a direction crossing the rotation axis Ax3. The auxiliary link 50 may be fixed to the drive link 40 in a state where the relative movement with respect to the turning link 20 is possible in the direction crossing the rotation axis Ax2 and relative movement with respect to the arm base portion 62 (arm link 60) is possible in the direction crossing the rotation axis Ax3. The robot 1 may include a bearing that holds the auxiliary link 50 to rotate around the rotation axis Ax3.

[Seal]

Figure 7:
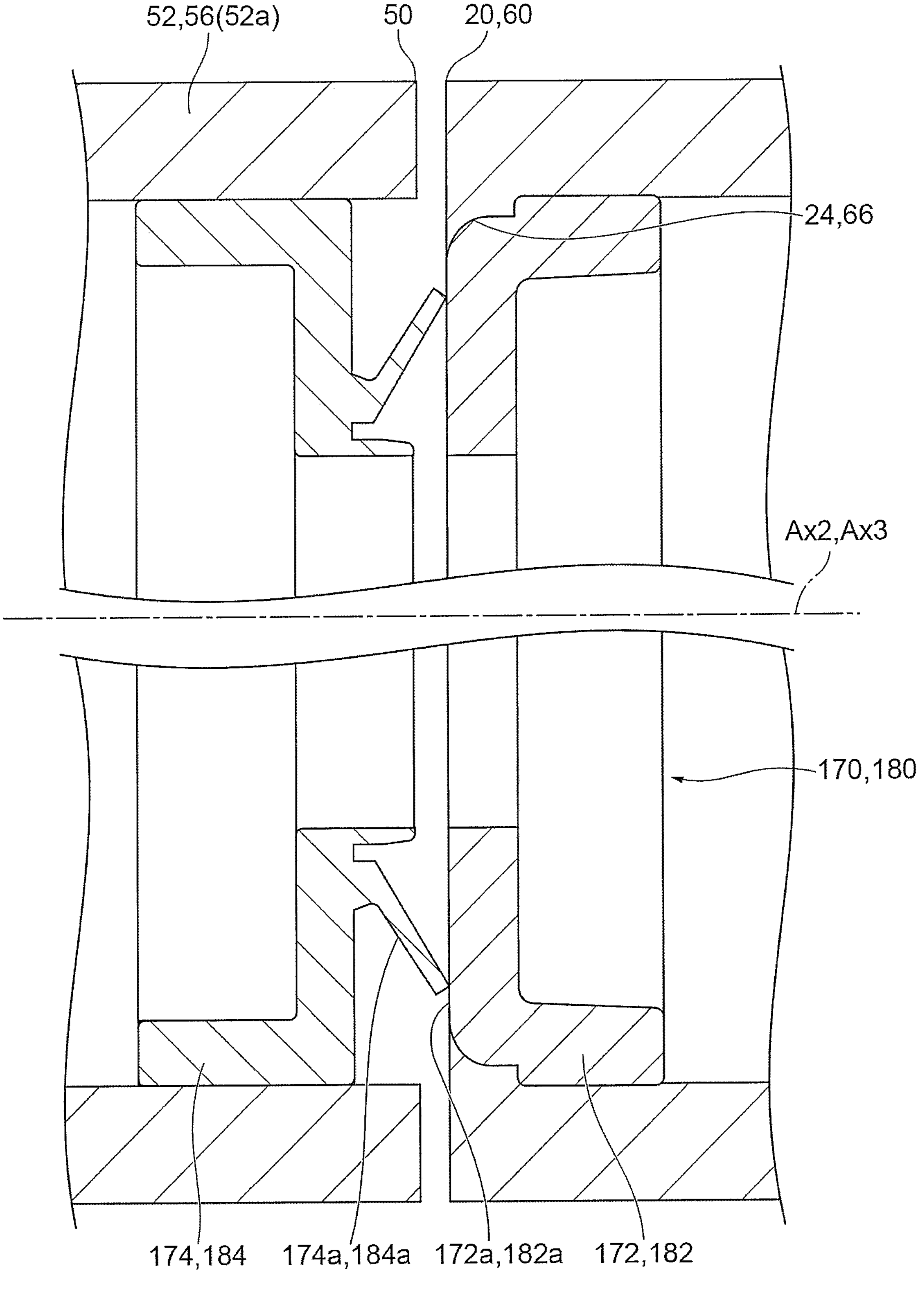
FIG. 7 is a sectional view schematically illustrating an example of a seal provided between links.

FIG. 7 is an enlarged view of portions indicated by “A” and “B” in FIG. 3, and FIG. 7 schematically illustrates a seal installed between the links. The robot 1 may include a seal 170. The seal 170 is a member (sealing member) interposed between the auxiliary link 50 and the turning link 20 around the opening 24. The seal 170 may be configured to seal between the auxiliary link 50 and the turning link 20 (to close a gap between the auxiliary link 50 and the turning link 20). For example, the seal 170 is interposed at a connecting portion between the auxiliary link 50 and the turning link 20, and thus, it is possible to prevent a liquid such as water from entering the internal space S2 of the turning link 20 from the outside and a liquid such as water from entering the wiring space S5 via the connecting portion.

The seal 170 may be configured to be interposed between the auxiliary link 50 and the turning link 20 (to seal between the auxiliary link 50 and the turning link 20) while allowing the relative displacement between the auxiliary link 50 and the turning link 20 in the direction crossing the rotation axis Ax2. The seal 170 includes, for example, a first member 172 and a second member 174. Each of the first member 172 and the second member 174 is formed in an annular shape around the rotation axis Ax2. The first member 172 and the second member 174 are arranged to face each other in the axial direction of the rotation axis Ax2. The first member 172 is connected to an inner wall surface forming the opening 24 in the turning link 20. The second member 174 is connected to a portion of the proximal end portion of the auxiliary link 50, which is attached to the turning link 20.

The first member 172 and the second member 174 come into contact with each other while allowing relative displacement therebetween. The first member 172 includes a sealing surface 172*a*. The sealing surface 172*a* is a surface along a plane crossing the rotation axis Ax2. The sealing surface 172*a* may be along a plane orthogonal to the rotation axis Ax2. The sealing surface 172*a* is formed in an annular shape around the rotation axis Ax2.

The second member 174 includes a sealing element 174*a*. The sealing element 174*a* is an element (portion) that is displaced along the sealing surface 172*a* in accordance with the relative displacement between the auxiliary link 50 and the turning link 20 while being in close contact with the sealing surface 172*a* of the first member 172. The seal 170 is formed such that a state where the sealing element 174*a* comes into contact with the sealing surface 172*a* is maintained even though the relative displacement between the auxiliary link 50 and the turning link 20 occurs. The sealing element 174*a* is formed in an annular shape around the rotation axis Ax2. The sealing element 174*a* may be formed to spread from a body portion of the second member 174 in a radial direction of a circle with the rotation axis Ax2 as a center in a state of being inclined with respect to the rotation axis Ax2.

The seal 170 including the sealing surface 172*a* and the sealing element 174*a* may be formed in any manner. The first member 172 including the sealing surface 172*a* may be provided on the auxiliary link 50, and the second member 174 including the sealing element 174*a* may be provided on the turning link 20.

In addition to the seal 170, the robot 1 may include a seal 180 (second seal). The seal 180 is a member (sealing member) interposed between the auxiliary link 50 and the arm base portion 62 of the arm link 60 around the opening 66. The seal 180 may be formed to seal between the auxiliary link 50 and the arm base portion 62 (to close a gap between the auxiliary link 50 and the arm base portion 62). For example, the seal 180 is interposed at a connecting portion between the auxiliary link 50 and the arm base portion 62 of the arm link 60, and thus, it is possible to prevent a liquid such as water from entering the internal space S6 of the arm link 60 from the outside and a liquid such as water from entering the wiring space S5 via the connecting portion.

The seal 180 may be formed to be interposed between the auxiliary link 50 and the arm base portion 62 (to seal between the auxiliary link 50 and the arm base portion 62) while allowing relative displacement between the auxiliary link 50 and the arm base portion 62 in the direction crossing the rotation axis Ax3. The seal 180 includes, for example, a first member 182 and a second member 184. The first member 182 and the second member 184 are arranged to face each other in the axial direction of the rotation axis Ax3. The first member 182 is connected to an inner wall surface forming the opening 66 in the arm base portion 62. The second member 184 is connected to a portion of the distal end portion of the auxiliary link 50, which is attached to the arm base portion 62.

The first member 182 and the second member 184 comes into contact with each other while allowing relative displacement therebetween. The first member 182 includes a sealing surface 182*a*. The sealing surface 182*a* is a surface along a plane crossing the rotation axis Ax3. The sealing surface 182*a* may be along a plane orthogonal to the rotation axis Ax3. The sealing surface 182*a* is formed in an annular shape around the rotation axis Ax3.

The second member 174 includes a sealing element 184*a*. The sealing element 184*a* is an element (portion) that is displaced along the sealing surface 182*a* in accordance with the relative displacement between the auxiliary link 50 and the arm link 60 while being in close contact with the sealing surface 182*a* of the first member 182. The seal 180 is formed such that a state where the sealing element 184*a* comes into contact with the sealing surface 182*a* is maintained even though the relative displacement between the auxiliary link 50 and the arm link 60 occurs. The sealing element 184*a* is formed in an annular shape around the rotation axis Ax3. The sealing element 184*a* may be formed to spread from a body portion of the second member 184 in a radial direction of a circle with the rotation axis Ax3 as a center in a state of being inclined with respect to the rotation axis Ax3.

The seal 180 including the sealing surface 182*a* and the sealing element 184*a* may be formed in any manner. The first member 182 including the sealing surface 182*a* may be provided on the auxiliary link 50, and the second member 184 including the sealing element 184*a* may be provided on the arm base portion 62.

In a case where the materials forming the drive link 40 and the auxiliary link 50 are different from each other, the deformation of the drive link 40 and the deformation of the auxiliary link 50 due to thermal expansion or the like may be different depending on the difference between the thermal expansion coefficients of the materials. By contrast, since the seal 170 and the seal 180 do not constrain the movement of the auxiliary link 50 in the direction crossing the rotation axis, it is possible to allow a positional deviation (for example, a deviation of the rotation axis) due to the difference in the deformation between the links.

[Structure for Maintenance of Motor]

Figure 8:
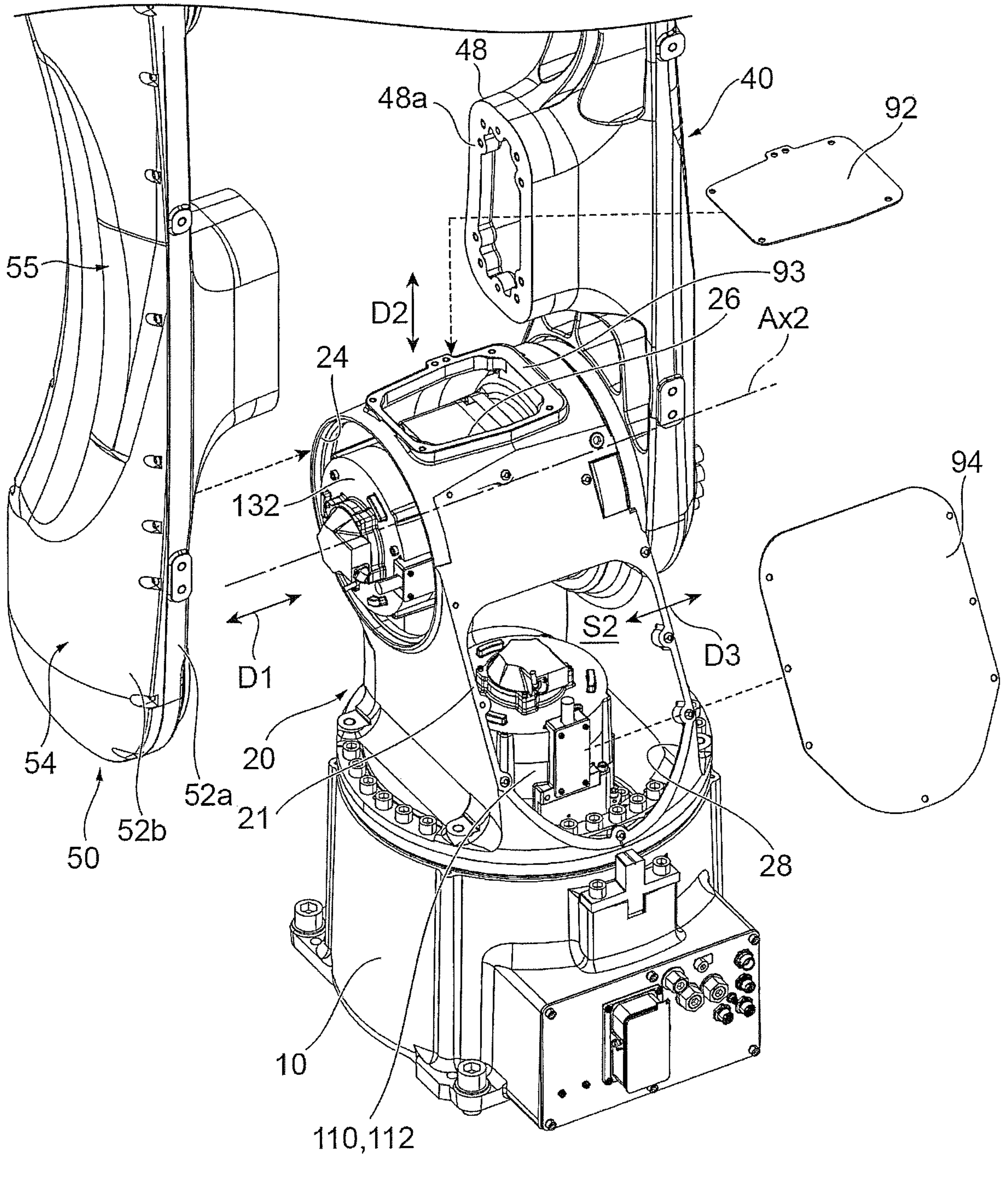
FIG. 8 is a perspective view illustrating a part of a robot in a state where a cover is detached.
Figure 9:
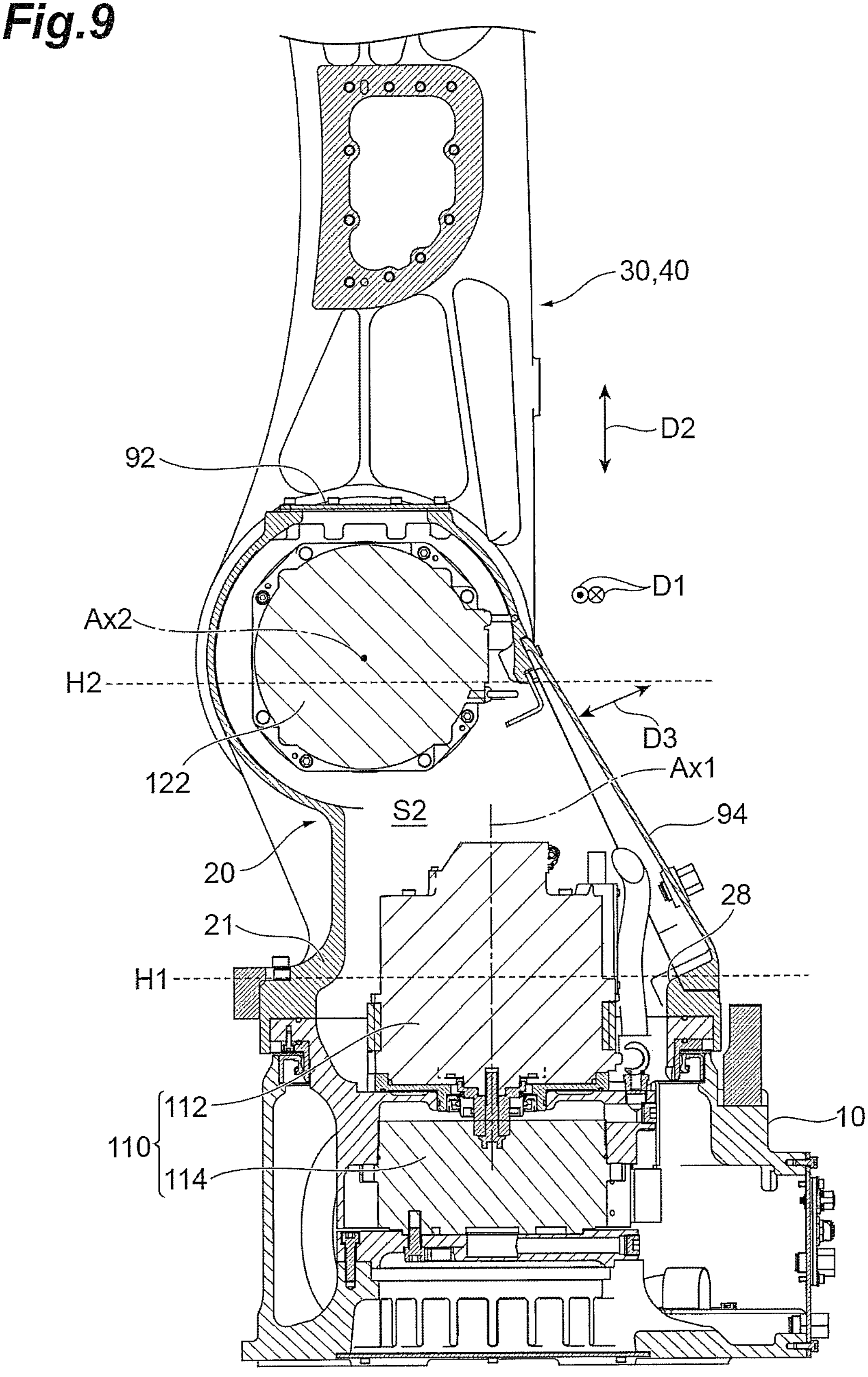
FIG. 9 is a sectional view illustrating an example of an inside of a turning link.
Figure 10:
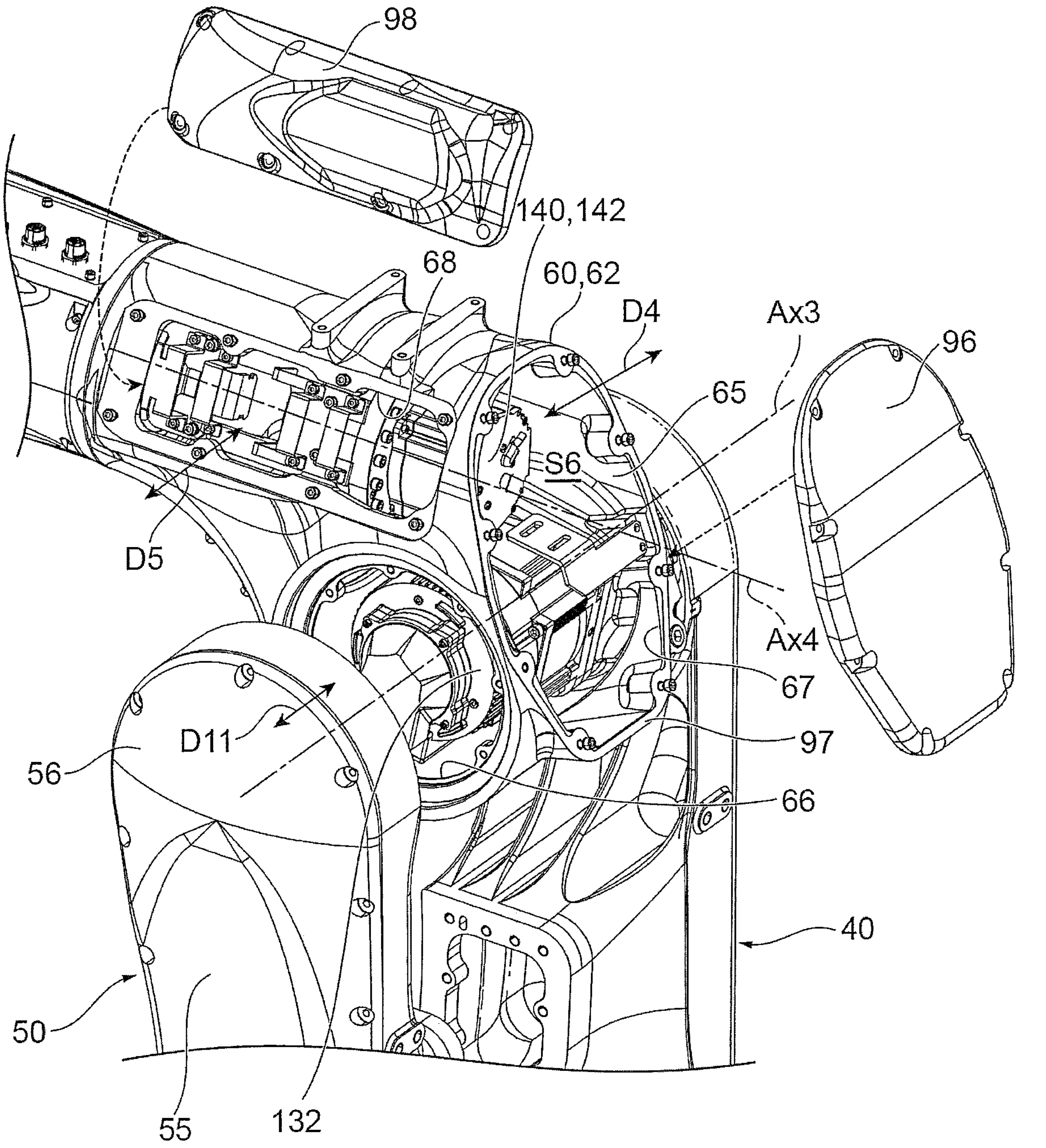
FIG. 10 is a perspective view illustrating a part of a robot in a state where a cover is detached.

Next, a structure for performing maintenance of a motor of an actuator included in the robot 1 will be described. The maintenance of the motor may include replacement of the motor. FIG. 8 illustrates the robot 1 in a state where some members are moved such that the inside of the turning link 20 can be seen. FIG. 9 is a sectional view illustrating the inside of the turning link 20. FIG. 10 illustrates the robot 1 in a state where some members are moved such that the inside of the arm base portion 62 of the arm link 60 can be seen.

As illustrated in FIG. 8, the opening 24 is provided in the turning link 20. The opening 24 (access opening) may be an opening that allows the motor 122 of the actuator 120 to be taken in and out of the turning link 20 from a direction D1 (first direction) along the rotation axis Ax2. The opening 24 may have a size that allows the motor 122 to be taken in and out. The housing 21 forming the internal space S2 of the turning link 20 may include a pair of side walls crossing the rotation axis Ax2 and a peripheral wall connecting parts of outer edges of the pair of side walls around the rotation axis Ax2. The opening 24 may be provided in the side wall of the pair of side walls, which is closer to the auxiliary link 50.

The motor 122 may be taken in and out of the internal space S2 of the turning link 20 from the direction D1. The direction D1 is, for example, a direction in which the turning link 20 and the drive link 40 are aligned on the rotation axis Ax2. The direction D1 may be orthogonal to a plane including the opening 24 (a plane including an opening edge forming the opening 24). The motor 122 may be inserted into the internal space S2 or may be taken out from the internal space S2 in a state where the output shaft 122*b* is horizontal and is along the direction D1. The motor 122 is taken in and out by, for example, a worker.

The robot 1 may include an access cover 54. The access cover 54 is a cover that covers the opening 24 provided in the turning link 20. The access cover 54 may be configured to be attached to the turning link 20 to cover the motor 122 from the direction D1, and be detached from the turning link 20 such that the motor 122 can be taken in and out of the turning link 20 from the direction D1. The access cover 54 may be a part of the auxiliary link 50. The proximal end portion of the auxiliary link 50 may function as the access cover 54. When the worker attaches the motor 122, for example, the worker detaches the access cover 54, then the worker inserts the motor 122 into the internal space S2 such that the output shaft 122*b* is connected to the speed reducer 124 accommodated in the connecting portion 42 of the drive link 40.

In addition to the opening 24, an opening 26 may be provided in the turning link 20 (housing 21). The opening 26 may be provided in the peripheral wall of the housing 21. The opening 26 (check opening) is an opening that allows the actuator 120 to be visually recognized from a direction D2 (second direction) crossing the rotation axis Ax2. The opening 26 allows the worker to visually recognize the motor 122 when the motor 122 is taken in and out. The worker may be able to visually recognize the motor 122 via the opening 26 from the direction D2. The direction D2 is a direction crossing a plane including the opening 26 (a plane including an opening edge forming the opening 26). The opening 26 is formed to be positioned above the motor 122 attached in the internal space S2. At least a part of the component in the direction D2 may be a component directed vertically downward. The opening 26 may have a size that prevents the motor 122 from being taken in and out via the opening.

The robot 1 may include a check cover 92. The check cover 92 is a cover that covers the opening 26 provided in the turning link 20. The check cover 92 may be configured to be attached to the turning link 20 to cover the motor 122 from the direction D2, and to be detached from the turning link 20 to allow the motor 122 to be visually recognized from the direction D2. The check cover 92 may be attached to the turning link 20 to cover the motor 122 from above. When the worker attaches the motor 122, for example, the worker detaches the check cover 92, and performs a work while visually recognizing a state such as the inclination of the output shaft 122*b* from the opening 26.

The robot 1 may include a check seal 93 (first check seal). The check seal 93 is a sealing member interposed between the check cover 92 and the turning link 20. The check seal 93 may be configured to seal between the check cover 92 and the turning link 20. The check seal 93 is provided, for example, along the opening edge forming the opening 26. By providing the check seal 93, a substance such as a liquid is prevented from entering the internal space S2 from the outside via the connecting portion between the check cover 92 and the turning link 20, and a substance such as a liquid is prevented from leaking from the internal space S2 to the outside.

In addition to the opening 24 and the opening 26, an opening 28 may be formed in the housing 21. The opening 28 (sub-access opening) may be provided in the peripheral wall of the housing 21. The opening 28 is an opening that enables access to the motor 122 from a direction D3 (third direction) crossing both the direction D1 and the direction D2. Being able to access the motor 122 means that the worker himself/herself can touch the motor 122 or a tool operated by the worker can touch the motor 122. The direction D3 is a direction crossing a plane including the opening 28 (a plane including an opening edge forming the opening 28).

The actuator 110 may be accommodated in the internal space S2 in the housing 21. The motor included in the actuator 110 is referred to as "motor 112", and the speed reducer included in the actuator 110 is referred to as "speed reducer 114". The motor 112 (base motor) is accommodated in the turning link 20 and rotates the turning link 20 around the rotation axis Ax1 (base axis). The opening 28 may have a size that allows the motor 112 to be taken in and out of the turning link 20. For example, the worker can insert the motor 112 into the internal space S2 in the turning link 20 and can take out the motor 112 from the internal space S2 via the opening 28.

The robot 1 may include a sub-access cover 94. The sub-access cover 94 is a cover that covers the opening 28 provided in the turning link 20. The sub-access cover 94 may be configured to be attached to the turning link 20 to cover the motor 122 from the direction D3, and be detached from the turning link 20 to allow access to the motor 122 from the direction D3. When the worker attaches the motor 122, for example, the worker detaches the sub-access cover 94, puts his or her hand into the internal space S2 via the opening 28, and performs an attachment work of the motor 122 such that the output shaft 122*b* of the motor 122 is connected to the speed reducer 124 while supporting the motor 122 from below.

As illustrated in FIG. 9, a lower end of the motor 122 may be positioned above an upper end of the motor 112. An upper edge of the opening 28 may be positioned above the upper end of the motor 112, and a lower edge of the opening 28 may be positioned below an upper end of the motor 122. The upper edge of the opening 28 may be positioned above the lower end of the motor 122. A positional relationship among the motor 112, the motor 122, and the opening 28 means a relationship in a state where the motor 112 and the motor 122 are attached. In FIG. 9, a position of the upper edge of the opening 28 in the axial direction of the rotation axis Ax1 is indicated by “H2”, and a position of the lower edge of the opening 28 in the axial direction of the rotation axis Ax1 is indicated by “H1”.

As illustrated in FIG. 10, the opening 66 may be provided in the arm base portion 62. The opening 66 (second access opening) may be an opening that allows the motor 132 of the actuator 130 to be taken in and out of the arm base portion 62 from a direction D11 (third direction) along the rotation axis Ax3. The opening 66 may have a size that allows the motor 132 to be taken in and out. The housing 65 in the arm base portion 62 may include at least a pair of side walls crossing the rotation axis Ax3. The opening 66 may be provided on the side wall of the pair of side walls of the housing 65, which is closer to the auxiliary link 50.

The motor 132 may be taken in and out of the internal space S6 of the arm base portion 62 from the direction D11. The direction D11 is, for example, a direction in which the arm base portion 62 and the drive link 40 are aligned on the rotation axis Ax3. The direction D11 may be orthogonal to a plane including the opening 66 (a plane including an opening edge forming the opening 66). The motor 132 may be inserted into the internal space S6 or may be taken out from the internal space S6 in a state where the output shaft 132*b* is horizontal and along the direction D11. The motor 132 is taken in and out by, for example, a worker.

The robot 1 may include an access cover 56 (second access cover). The access cover 56 is a cover that covers the opening 66. The access cover 56 may be configured to be attached to the arm base portion 62 to cover the motor 132 from the direction D11, and be detached from the arm base portion 62 to allow the motor 132 to be taken in and out from the arm base portion 62 from the direction D11. The access cover 56 may be a part of the auxiliary link 50. The distal end portion of the auxiliary link 50 may function as the access cover 56.

In a case where a part of the auxiliary link 50 functions as the access cover 54 covering the motor 122 and the other part of the auxiliary link 50 functions as the access cover 56 covering the motor 132, the robot 1 includes a connection member 55 constituting the auxiliary link 50 (sub-link). The connection member 55 is a portion that couples the access cover 54 and the access cover 56 of the auxiliary link 50 and extends from the access cover 54 to the access cover 56. For example, the connection member 55 is formed to extend along a line segment connecting the rotation axis Ax2 and the rotation axis Ax3 at the shortest distance, one end of the connection member 55 is connected to the access cover 54, and the other end of the connection member 55 is connected to the access cover 56. The connection member 55 is attached to the drive link 40.

As described above, the auxiliary link 50 may include the link body 52 and the protruding section 58. The link body 52 may be formed by the access cover 54, the access cover 56, and a part of connection member 55, and the protruding section 58 may be formed by another part of the connection member 55. The connection member 55 may be attached to the drive link 40 by fixing the protruding section 58 of the connection member 55 to the reinforcing section 48 (protruding section 48*a*) of the drive link 40 as described above.

The access cover 54 may be formed by a portion of the link body 52 covering the motor 122 and a portion connected to the seal 170. The seal 170 (first access seal) described above may be interposed between the turning link 20 and the access cover 54 while allowing the rotation of the auxiliary link 50 relative to the turning link 20. The access cover 56 may be formed by a portion of the link body 52 covering the motor 132 and a portion connected to the seal 180. The above-described seal 180 (second access seal) may be interposed between the arm base portion 62 and the access cover 56 while allowing the rotation of the auxiliary link 50 with respect to the arm base portion 62.

When the worker attaches the motor, for example, after the worker detaches the access cover 56, the worker inserts the motor 132 into the internal space S6 such that the output shaft 132*b* is connected to the speed reducer 134 accommodated in the connecting section 46 of the drive link 40.

In addition to the opening 66, an opening 67 may be provided in the arm base portion 62 (housing 65). The opening 67 (second check opening) allows the motor 132 to be visually recognized from a direction D4 (fourth direction) crossing the rotation axis Ax3. The opening 67 allows the worker to visually recognize the motor 132 when the motor 132 is taken in and out. The worker may be able to visually recognize the motor 132 via the opening 67 from the direction D4. The direction D4 is a direction crossing a plane including the opening 67 (a plane including an opening edge forming the opening 67).

The robot 1 may include a check cover 96 (second check cover). The check cover 96 is a cover that covers the opening 67 provided in the arm base portion 62. The check cover 96 may be configured to be attached to the arm base portion 62 to cover the motor 132 from the direction D4, and be detached from the arm base portion 62 to make the motor 132 visible from the direction D4. When the worker attaches the motor 132, for example, the worker detaches the check cover 96, and performs a work while visually recognizing a state such as the inclination of the output shaft 132*b* from the opening 67.

The robot 1 may include a check seal 97 (second check seal). The check seal 97 is a sealing member interposed between the check cover 96 and the arm base portion 62. The check seal 97 may be configured to seal between the check cover 96 and the arm base portion 62. The check seal 97 is provided, for example, along an opening edge forming the opening 67. By providing the check seal 97, a substance such as a liquid is prevented from entering the internal space S6 and a substance such as a liquid is prevented from leaking from the internal space S6 to the outside via the connecting portion between the check cover 96 and the arm base portion 62.

The actuator 140 includes a motor 142 (third motor). For example, the motor 142 rotates the turning arm 64 around a rotation axis Ax4 (third rotation axis) with respect to the arm base portion 62, the rotation axis Ax4 is along the direction in which the arm base portion 62 extends. The motor 142 may be accommodated in the arm base portion 62. The motor 142 may be installed such that an output shaft is horizontal.

The motor 142 may be taken in and out of the internal space S6 of the arm base portion 62 from the direction D4 (for example, a direction along the rotation axis Ax4). The motor 142 may be inserted into the internal space S6 or may be taken out from the internal space S6 in a state where the output shaft is horizontal and is along the rotation axis Ax4. The motor 142 is taken in and out by, for example, a worker. The opening 67 may have a size that allows the motor 142 to be taken in and out of the arm base portion 62. The worker can visually recognize the motor 132 and the motor 142 may be taken in and out of the arm base portion 62 via the opening 67.

In addition to the opening 66 and the opening 67, an opening 68 may be provided in the arm base portion 62 (housing 65). The opening 68 (third check opening) allows the motor 142 to be visually recognized from a direction D5 crossing the rotation axis Ax4. The opening 68 allows the worker to visually recognize the motor 142 when the motor 142 is taken in and out. The worker may be able to visually recognize the motor 142 via the opening 68 from the direction D5. The direction D5 is a direction crossing a plane including the opening 68 (a plane including an opening edge forming the opening 68).

The robot 1 may include a check cover 98 (third check cover). The check cover 98 is a cover that covers the opening 68 provided in the arm base portion 62. The check cover 98 may be configured to be attached to the arm base portion 62 to cover the motor 142 from the direction D5, and be detached from the arm base portion 62 to allow the motor 142 to be visually recognized from the direction D5. When the worker attaches the motor 142, for example, the worker detaches the check cover 98, and performs a work while visually recognizing a state such as the inclination of the motor 142 from the opening 68.

In the above example, a case where the entire auxiliary link 50 is detached from the other member and the motor 122 and the motor 132 are taken in and out has been described. Instead of the entire auxiliary link 50, the motor 122 and the motor 132 may be taken in and out by detaching a cover portion included in the auxiliary link 50 from the other portion of the auxiliary link 50. As illustrated in FIG. 3, the link body 52 of the auxiliary link 50 may include a body portion 52*a* and a cover portion 52*b* (see also FIGS. 7 and 8).

The cover portion 52*b* may be attached to the body portion 52*a* via a fixing member 52*c*. A part of the seal 170 and a part of the seal 180 described above may be provided in the body portion 52*a*. In a state where the cover portion 52*b* is detached from the body portion 52*a* (a state before being attached to the body portion 52*a*), a worker may perform an attachment work via a fixing member between the protruding section 58 of the auxiliary link 50 and the reinforcing section 48 of the drive link 40. In a state where the cover portion 52*b* is detached from the body portion 52*a* in a state of being fixed to the drive link 40 (a state before being attached to the body portion 52*a*), a worker may perform a work of wiring the cable harness 90.

By detaching the cover portion 52*b* from the body portion 52*a* in a state of being fixed to the drive link 40, the motor 122 can be taken in and out via the opened wiring space S5 and opening 24, and the motor 132 can be taken in and out via the opened wiring space S5 and opening 66. Of the cover portion 52*b* which is a part of the drive link 40, a portion that covers the opening 24 from the direction D1 along the rotation axis Ax2 may function as the access cover 54 described above. Of the cover portion 52*b* which is a part of the drive link 40, a portion covering the opening 66 from the direction D11 along the rotation axis Ax3 may function as the access cover 56 described above.

[Modified Example]

In the arm link 30, the drive link 40 and the auxiliary link 50 may be made of the same material. For example, the drive link 40 may be made of a material including aluminum, and the auxiliary link 50 may be made of a material including aluminum. Since the actuator 120 and the actuator 130 are connected to the drive link 40, the influence of heat received from the actuator is different between the drive link 40 and the auxiliary link 50. As a result, even in a case where the drive link 40 and the auxiliary link 50 are made of the same material, the deformation of the drive link 40 and the deformation of the auxiliary link 50 due to the thermal expansion or the like may be different. Thus, even in a case where the drive link 40 and the auxiliary link 50 are made of the same material, the seal 170 and the seal 180 that do not constrain the movement of the auxiliary link 50 in the direction crossing the rotation axis may be provided in order to allow the positional deviation (for example, the deviation of the rotation axis) due to the difference in the deformation between the links.

Figure 11:
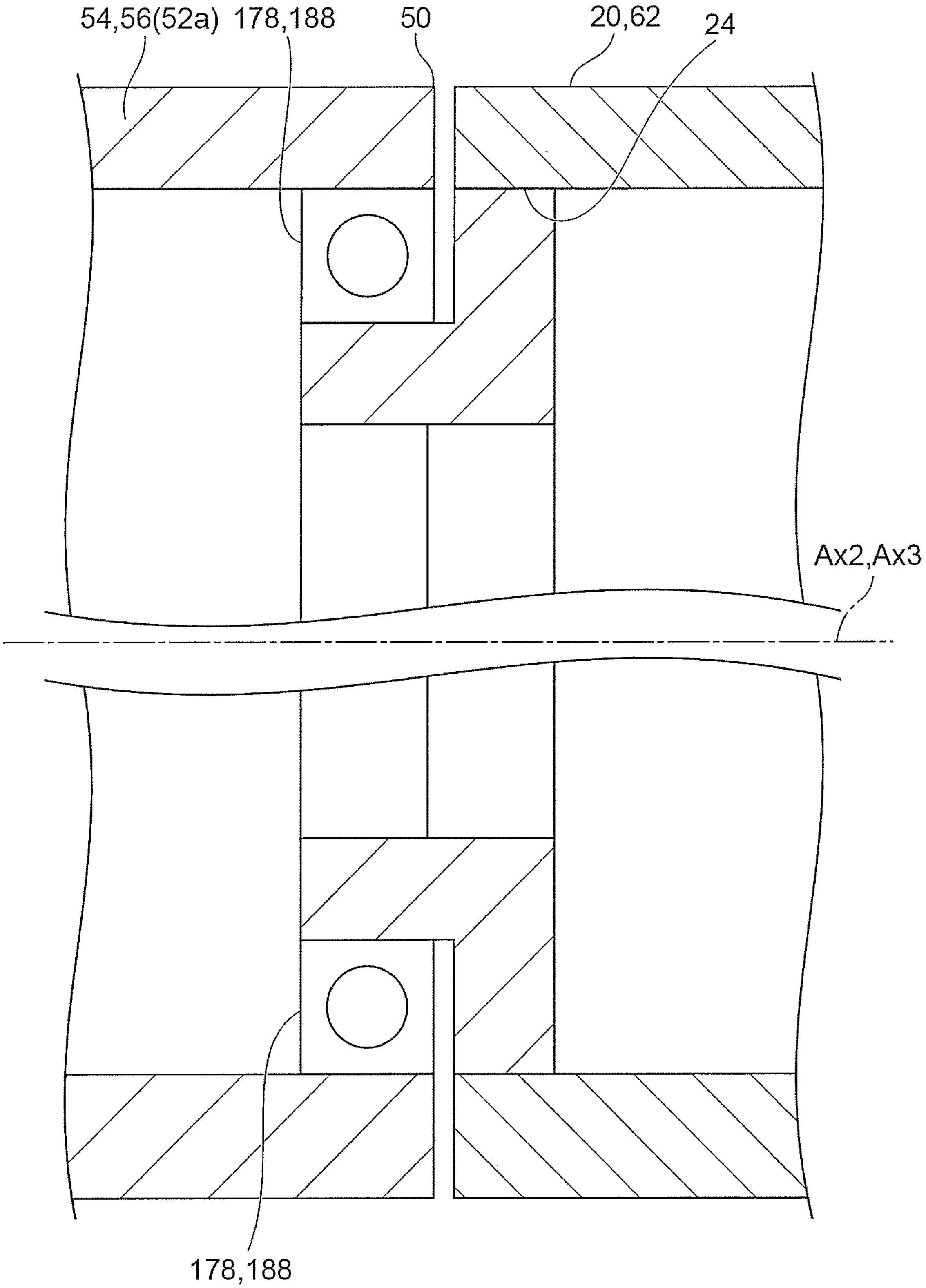
FIG. 11 is a sectional view schematically illustrating an example of a bearing provided between links.

As illustrated in FIG. 11, the robot 1 may include a bearing 178 and a bearing 188 instead of the seal 170 and the seal 180. The bearing 178 is a bearing member that holds the auxiliary link 50 to rotate around the rotation axis Ax2. The bearing 178 is provided, and thus, the relative movement of the auxiliary link 50 with respect to the turning link 20 may be constrained in the direction crossing the rotation axis Ax2.

The bearing 188 (second bearing) is a bearing member that holds the auxiliary link 50 to rotate around the rotation axis Ax3 with respect to the arm base portion 62. The bearing 188 is provided, and thus, the relative movement of the auxiliary link 50 with respect to the arm base portion 62 may be constrained in the direction crossing the rotation axis Ax3. Each of the bearing 178 and the bearing 188 may be any type of bearing member, and is, for example, a ball bearing or a roller bearing. The robot 1 may include the bearing 178 in addition to the seal 170. The robot 1 may include the bearing 188 in addition to the seal 180.

In the example described with reference to FIGS. 1 to 10, the material forming the drive link 40 and the material forming the auxiliary link 50 are different from each other, and the bearing 178 and the bearing 188 are not provided. In a case where the material forming the drive link 40 and the material forming the auxiliary link 50 are different from each other, the bearing 178 and the bearing 188 may be provided. In a case where the material forming the drive link 40 and the material forming the auxiliary link 50 are the same, the bearing 178 and the bearing 188 may not be provided, and the bearing 178 and the bearing 188 may be provided.

In one example of the various examples described above, at least a part of the matters described in another example may be combined.

[Summary of Present Disclosure]

The present disclosure includes configurations of the following [1] to [17].

[1] A robot (1) including: a link (40); and an actuator (120) configured to rotate the link (40) around a rotation axis (Ax2), in which the link (40) includes a connecting section (42) connected to the actuator (120), a link base section (44) crossing the rotation axis (Ax2) to extend from the connecting section (42), and a protruding section (48*a*) protruding from the link base section (44) at a position away from each of the connecting section (42) and an end portion of the link base section (44) between the connecting section (42) and the end portion of the link base section (44).

In the robot (1), the link base section (44) can be thinned while high rigidity is imparted to the link base section (44) by the protruding section (48*a*). Therefore, the robot (1) is effective for both weight reduction and rigidity improvement.

[2] The robot (1) according to the above [1], in which the link (40) further includes a rib (48*b*) protruding from the link base section (44), and the rib (48*b*) is connected to at least the protruding section (48*a*).

In this case, the link base section (44) is reinforced by the protruding section (48*a*) and the rib (48*b*). Thus, higher rigidity can be imparted to the link base section (44).

[3] The robot (1) according to the above [2], in which the rib (48*b*) connects the protruding section (48*a*) and the connecting section (42).

In this case, since a reinforcement effect by the portion including the protruding section (48*a*) spreads to the connecting section (42), the link base section (44) can be further thinned while higher rigidity is further imparted to the link base section (44). Therefore, it is effective for further achieving both weight reduction and rigidity improvement.

[4] The robot (1) according to the above [2] or [3], in which a protruding height of the rib (48*b*) with respect to the link base section (44) increases as a distance from the protruding section (48*a*) decreases at least in a direction in which the link base section (44) extends.

In this case, the protruding height of the rib (48*b*) increases as the distance from the protruding section (48*a*) decreases while widening the reinforcement effect by the portion including the protruding section (48*a*) to a distal portion from the protruding section (48*a*), and thus, both weight reduction and rigidity improvement can be further achieved.

[5] The robot (1) according to the above [4], in which the protruding height of the rib (48*b*) with respect to the link base section (44) increases as the distance from the protruding section (48*a*) decreases even in a direction crossing the direction in which the link base section (44) extends.

In this case, in the crossing direction, the protruding height of the rib (48*b*) increases as a distance from the protruding section (48*a*) decreases, and thus, both weight reduction and rigidity improvement can also be further achieved.

[6] The robot (1) according to any one of the above [3] to [5], in which the connecting section (42) includes a connecting base section (42*a*) continued to the link base section (44) to be connected to the actuator (120), and a surrounding wall (42*b*) protruding from the connecting base section (42*a*) to surround at least a part of the actuator (120), the protruding section (48*a*) and the rib (48*b*) protrude in the same direction as the surrounding wall (42*b*), and the rib (48*b*) is connected to the surrounding wall (42*b*).

In this case, the connecting base section (42*a*) can be thinned while high rigidity is imparted to the connecting base section (42*a*) by the surrounding wall (42*b*). Further, the rigidity of the entire link (40) can be further improved by connecting the protruding section (48*a*) to the surrounding wall (42*b*) via the rib (48*b*). Therefore, it is effective for further achieving both weight reduction and rigidity improvement.

[7] The robot (1) according to the above [6], in which the link (40) includes a plurality of ribs (48*b*) including the rib (48*b*), each of the plurality of ribs (48*b*) connects the protruding section (48*a*) and the surrounding wall (42*b*), and an interval between the plurality of ribs (48*b*) increases as a distance from the protruding section (48*a*) increases.

In this case, both flexural rigidity and torsional rigidity of the link base section (44) can be improved.

[8] The robot (1) according to any one of the above [1] to [7], in which the protruding section (48*a*) is formed in an annular shape around an axis (Ax0) crossing the link base section (44).

In this case, a weight of the protruding section (48*a*) can be reduced.

[9] The robot (1) according to any one of the above [3] to [5], further including: a second link (60 or 62) connected to an end portion of the link (40); and a second actuator (130) configured to rotate the second link (60 or 62) around a second rotation axis (Ax3) parallel to the rotation axis (Ax2), in which the link (40) further includes a second connecting section (46) connected to the second actuator (130), and a second rib (48*c*) connecting the protruding section (48*a*) and the second connecting section (46).

In this case, the protruding section (48*a*) is connected to the connecting section (42) and the second connecting section (46) via the rib (48*b*) and the second rib (48*c*), and thus, the link base section (44) can be thinned while higher rigidity is further imparted to the link base section (44). The rigidity improvement of the link base section (44) also contributes to the improvement of positioning accuracy of the distal end portion of the second link (60 or 62).

[10] The robot (1) according to the above [9], in which the connecting section (42) includes a connecting base section (42*a*) continued to the link base section (44) to be connected to the actuator (120), and a surrounding wall (42*b*) protruding from the connecting base section (42*a*) to surround at least a part of the actuator (120), the second connecting section (46) includes a second connecting base section (46*a*) continued to the link base section (44) to be connected to the second actuator (130), and a second surrounding wall (46*b*) protruding from the second connecting base section (46*a*) to surround at least a part of the second actuator (130), the protruding section (48*a*), the rib (48*b*), and the second rib (48*c*) protrude in the same direction as the surrounding wall (42*b*) and the second surrounding wall (46*b*), the rib (48*b*) is connected to the surrounding wall (42*b*), and the second rib (48*c*) is connected to the second surrounding wall (46*b*).

In this case, the connecting base section (42*a*) can be thinned while high rigidity is imparted to the connecting base section (42*a*) by the surrounding wall (42*b*). Similarly, the second connecting base section (46*a*) can be thinned while high rigidity is imparted to the second connecting base section (46*a*) by the second surrounding wall (46*b*). Further, the protruding section (48*a*) is connected to the surrounding wall (42*b*) and the second surrounding wall (46*b*) via the rib (48*b*) and the second rib (48*c*), and thus, the rigidity of the entire link (40) can be further improved. Therefore, it is effective for further achieving both weight reduction and rigidity improvement.

[11] The robot (1) according to the above [10], in which the link (40) includes a plurality of ribs (48*b*) including the rib (48*b*), and a plurality of second ribs (48*c*) including the second rib (48*c*), each of the plurality of ribs (48*b*) connects the protruding section (48*a*) and the surrounding wall (42*b*), each of the plurality of second ribs (48*c*) connects the protruding section (48*a*) and the second surrounding wall (46*b*), an interval between the plurality of ribs (48*b*) increases as a distance from the protruding section (48*a*) increases, and an interval between the plurality of second ribs (48*c*) increases as a distance from the protruding section (48*a*) increases.

In this case, both the flexural rigidity and the torsional rigidity of the link base section (44) can be further improved.

[12] The robot (1) according to any one of the above [9] to [11], further including: a sub-link (50) configured to extend over between the rotation axis (Ax2) and the second rotation axis (Ax3) and rotate around the rotation axis (Ax2) together with the link (40), in which each of the actuator (120) and the second actuator (130) is positioned between the link (40) and the sub-link (50), and the sub-link (50) is attached to the protruding section (48).

In this case, the actuator (120) and the second actuator (130) are accommodated between the link (40) and the sub-link (50), and unevenness in an appearance of the robot (1) can be reduced.

[13] The robot (1) according to the above [12], further including: a cable harness (90) connected to at least the second actuator (130) via a space for accommodating the actuator (120), in which the sub-link (50) includes a wiring space (S5) for guiding the cable harness (90) from the space for accommodating the actuator (120) to the second actuator (130).

In this case, an inside of the sub-link (50) can be effectively used for wiring of the cable harness (90).

[14] The robot (1) according to the above [13], in which the protruding section (48*a*) is formed in an annular shape around an axis (Ax0) crossing the link base section (44), and an internal space (S4) of the protruding section (48*a*) and the wiring space (S5) communicate with each other at a connecting portion between the sub-link (50) and the protruding section (48).

In this case, a weight of the arm link (30) can be further reduced.

[15] The robot (1) according to any one of the above to [14], in which the sub-link (50) includes a sub-link body (52) extending between the rotation axis (Ax2) and the second rotation axis (Ax3), and a sub-protruding section (58) protruding from the sub-link body (52) toward the protruding section (48), and the sub-protruding section (58) is attached to the protruding section (48).

In this case, it is easy to position the sub-link (50) with respect to the link (40).

[16] The robot (1) according to any one of the above to [15], further including: a bearing (178) configured to hold the sub-link (50) to rotate around the rotation axis (Ax2); and a second bearing (188) configured to hold the sub-link (50) to rotate around the second rotation axis (Ax3) with respect to the second link (60 or 62).

In this case, the link (40) can be reinforced by the sub-link (50).

[17] The robot (1) according to any one of the above to [16], in which the link (40) is made of a first material, and the sub-link (50) is made of a second material having rigidity and specific gravity smaller than the first material.

In this case, since a material corresponding to each of a portion requiring rigidity and a portion not requiring high rigidity is used, both weight reduction and rigidity improvement can be further achieved.

[18] The robot (1) according to any one of the above [9] to [17], further including: a base link (10) fixed to an installation surface; and a turning link (20) connected to the base link (10) to rotate around a turning axis (Ax1) crossing the rotation axis (Ax2), in which the link (40) is connected to the turning link (20), the actuator (120) is configured to rotate the link (40) around the rotation axis (Ax2) with respect to the turning link (20), and the second link (60 or 62) extends away from the second rotation axis (Ax3).

In this case, in the link of the robot (1) close to the installation surface, both weight reduction and rigidity improvement are achieved, and thus, weight reduction and rigidity improvement of the entire robot can be achieved.

REFERENCE SIGNS LIST

1 robot
10 base link
20 turning link
S2 internal space
24, 28 opening
30 arm link
40 drive link
42, 46 connecting section
42*a*, 46*a* connecting base section
42*b*, 46*b* surrounding wall
44 link base section
48 reinforcing section
48*a* protruding section
S4 internal space
Ax0 axis
48*b*, 48*c* rib
50 auxiliary link
S5 wiring space
52 link body
58 protruding section
54 access cover
55 connection member
56 access cover
60 arm link
62 arm base portion
S6 internal space
66, 67 opening
64 turning arm
90 cable harness
92, 96, 98 check cover
93, 97 check seal
94 sub-access cover
Ax1, Ax2, Ax3, Ax4 rotation axis
110, 120, 130, 140 actuator
112, 122, 132, 142 motor
170, 180 seal
172*a*, 182*a* sealing surface
174*a*, 184*a* sealing element
178, 188 bearing.

What is claimed is:

1. A robot comprising:

a link; and an actuator configured to rotate the link around a rotation axis, wherein the link includes a connecting section connected to the actuator,
a link base section crossing the rotation axis to extend from the connecting section,
a protruding section protruding from the link base section at a position away from each of the connecting section and an end portion of the link base section between the connecting section and the end portion of the link base section, and
a rib protruding from the link base section,
wherein the rib is connected to at least the protruding section, and
wherein a protruding height of the rib with respect to the link base section increases as a distance from the protruding section decreases at least in a direction in which the link base section extends.

2. The robot according to claim 1, wherein
the protruding height of the rib with respect to the link base section increases as a distance from the protruding section decreases even in a direction crossing the direction in which the link base section extends.

3. The robot according to claim 1, wherein
the rib connects the protruding section and the connecting section.

4. The robot according to claim 3, wherein
the connecting section includes
a connecting base section continued to the link base section to be connected to the actuator, and
a surrounding wall protruding from the connecting base section to surround at least a part of the actuator,
the protruding section and the rib protrude in the same direction as the surrounding wall, and
the rib is connected to the surrounding wall.

5. The robot according to claim 4, wherein
the link includes a plurality of ribs including the rib,
each of the plurality of ribs connects the protruding section and the surrounding wall, and
an interval between the plurality of ribs increases as a distance from the protruding section increases.

6. The robot according to claim 3, further comprising:
a second link connected to an end portion of the link; and
a second actuator configured to rotate the second link around a second rotation axis parallel to the rotation axis, wherein
the link further includes
a second connecting section connected to the second actuator, and
a second rib connecting the protruding section and the second connecting section.

7. The robot according to claim 6, wherein
the connecting section includes
a connecting base section continued to the link base section to be connected to the actuator, and
a surrounding wall protruding from the connecting base section to surround at least a part of the actuator,
the second connecting section includes
a second connecting base section continued to the link base section to be connected to the second actuator, and
a second surrounding wall protruding from the second connecting base section to surround at least a part of the second actuator,
the protruding section, the rib, and the second rib protrude in the same direction as the surrounding wall and the second surrounding wall,
the rib is connected to the surrounding wall, and
the second rib is connected to the second surrounding wall.

8. The robot according to claim 7, wherein
the link includes a plurality of ribs including the rib and a plurality of second ribs including the second rib,
each of the plurality of ribs connects the protruding section and the surrounding wall,
each of the plurality of second ribs connects the protruding section and the second surrounding wall,
an interval between the plurality of ribs increases as a distance from the protruding section increases, and
an interval between the plurality of second ribs increases as a distance from the protruding section increases.

9. The robot according to claim 6, further comprising:
a sub-link configured to extend over between the rotation axis and the second rotation axis, and rotate around the rotation axis together with the link, wherein
each of the actuator and the second actuator is positioned between the link and the sub-link, and
the sub-link is attached to the protruding section.

10. The robot according to claim 9, further comprising:
a cable harness connected to at least the second actuator via a space for accommodating the actuator, wherein
the sub-link includes a wiring space for guiding the cable harness from the space for accommodating the actuator to the second actuator.

11. The robot according to claim 10, wherein
the protruding section is formed in an annular shape around an axis crossing the link base section, and
an internal space of the protruding section and the wiring space communicate with each other at a connecting portion between the sub-link and the protruding section.

12. The robot according to claim 9, wherein
the sub-link includes
a sub-link body extending over between the rotation axis and the second rotation axis, and
a sub-protruding section protruding from the sub-link body toward the protruding section, and
the sub-protruding section is attached to the protruding section.

13. The robot according to claim 9, further comprising:
a bearing configured to hold the sub-link to rotate around the rotation axis; and
a second bearing configured to hold the sub-link to rotate around the second rotation axis with respect to the second link.

14. The robot according to claim 9, wherein
the link is made of a first material, and
the sub-link is made of a second material having rigidity and specific gravity smaller than the first material.

15. The robot according to claim 6, further comprising:
a base link fixed to an installation surface; and
a turning link connected to the base link to rotate around a turning axis crossing the rotation axis, wherein
the link is connected to the turning link,
the actuator is configured to rotate the link around the rotation axis with respect to the turning link, and
the second link extends away from the second rotation axis.

16. The robot according to claim 1, wherein
the protruding section is formed in an annular shape around an axis crossing the link base section.

17. A robot comprising:
a link;
an actuator configured to rotate the link around a rotation axis; and
a sub-link configured to rotate around the rotation axis together with the link, wherein the link includes:

a connecting section connected to the actuator, a link base section crossing the rotation axis to extend from the connecting section, a protruding section protruding from the link base section at a position away from each of the connecting section and an end portion of the link base section between the connecting section and the end portion of the link base section, and a rib protruding from the link base section, wherein the rib is connected to at least the protruding section, and wherein the rib and the protruding section protrude toward the sub-link in a same direction as each other.

* * * * *